(12) United States Patent
Katsuyama

(10) Patent No.: US 7,341,352 B2
(45) Date of Patent: Mar. 11, 2008

(54) APPARATUS, METHOD AND PROGRAM FOR DETECTING A POINTER REGION, APPARATUS, METHOD AND PROGRAM FOR ASSOCIATING IMAGES, CONTENT-DISTRIBUTING SERVER, AND CONTENT-DISTRIBUTING METHOD

(75) Inventor: Yutaka Katsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 11/045,112

(22) Filed: Jan. 31, 2005

(65) Prior Publication Data

US 2005/0128297 A1    Jun. 16, 2005

Related U.S. Application Data

(63) Continuation of application No. PCT/JP03/03069, filed on Mar. 14, 2003.

(51) Int. Cl.
*G03B 21/14* (2006.01)
(52) U.S. Cl. .......................................... 353/42; 345/157
(58) Field of Classification Search ................. 353/42, 353/122; 345/156, 157, 158, 179, 181
See application file for complete search history.

(56) References Cited

U.S. PATENT DOCUMENTS

| | | | | |
|---|---|---|---|---|
| 6,275,214 B1 * | 8/2001 | Hansen | ......................... | 345/158 |
| 6,377,249 B1 * | 4/2002 | Mumford | ..................... | 345/179 |
| 6,766,066 B2 * | 7/2004 | Kitazawa | ..................... | 382/291 |
| 6,840,627 B2 * | 1/2005 | Olbrich | ........................ | 353/42 |
| 6,899,431 B2 * | 5/2005 | Wada | .......................... | 353/31 |
| 6,952,198 B2 * | 10/2005 | Hansen | ........................ | 345/158 |
| 7,091,949 B2 * | 8/2006 | Hansen | ........................ | 345/158 |
| 7,193,608 B2 * | 3/2007 | Stuerzlinger | ................ | 345/156 |
| 2003/0147053 A1 * | 8/2003 | Matsuda et al. | .............. | 353/31 |

FOREIGN PATENT DOCUMENTS

| | | |
|---|---|---|
| JP | 2000-339471 | 12/2000 |
| JP | 2001-209361 | 8/2001 |
| JP | 2001-307107 | 11/2001 |
| JP | 2001-325069 | 11/2001 |
| JP | 2001-344069 | 12/2001 |
| JP | 2002-374527 | 12/2002 |
| JP | 2003-058901 | 2/2003 |
| JP | 2003-58901 | 2/2003 |
| JP | 2003-504705 | 2/2003 |
| JP | 2001-307107 | 11/2004 |

* cited by examiner

*Primary Examiner*—William C. Dowling
(74) *Attorney, Agent, or Firm*—Staas & Halsey LLP

(57) ABSTRACT

An image-associating apparatus comprising a pointer-region detecting section 114, an image-associating section 109, and a pointer-region associating section 115. The section 14 that detects an optical pointer region indicating a prescribed position in an OHP image photographed in a video-frame image. The section 109 associates the OHP image photographed in the video-frame image, with an OHP file that is the source document of the OHP image. The section 115 associates the optical pointer region detected by the pointer-region detecting section, with the region of the OHP file associated by the image-associating section.

20 Claims, 14 Drawing Sheets

WHEN THE LASER POINTER MOVES FAST

WHEN THE LASER POINTER MOVES SLOWLY

APPARATUS, METHOD AND PROGRAM FOR DETECTING A POINTER REGION, APPARATUS, METHOD AND PROGRAM FOR ASSOCIATING IMAGES, CONTENT-DISTRIBUTING SERVER, AND CONTENT-DISTRIBUTING METHOD

CROSS REFERENCE TO RELATED APPLICATIONS

This is a continuing application, filed under 35 U.S.C. §111(a), of International Application PCT/JP03/03069, filed Mar. 14, 2003.

BACKGROUND OF THE INVENTION

1. Field of the Invention

The present invention relates to an apparatus, method and program for detecting a pointer position in the video-frame image that is projected by an overhead projector (OHP) during a lecture. The invention also relates to an apparatus, method and program for associating images, which can associate an OHP file used in, for example, a lecture with a moving image and can clearly indicate any region of an OHP-projected image, pointed during the lecture, on the OHP file. Further, the invention relates to a content-distributing server that can distribute contents thus prepared.

2. Description of the Related Art

E-learning is now being employed in the in-house education and general education. E-learning is a remote-place education method that uses the Internet. In most cases, it utilizes the WEB screen. E-learning is available in various types. The type that accomplishes ordinary lectures most well playbacks moving pictures (video images) and displays magnified OHP contents in synchronism with the playback of moving pictures. Seeing the OHP contents thus displayed, the students can easily understand the OHP contents. That is, the OHP-pointer and the content of whatever pointed can be displayed at the same time. This can provide an environment that is almost identical to the real lecture in the classroom.

To realize this system it is required that the OHP content displayed be synchronized with the moving picture that explains the OHP. The OHP content is manually synchronized with the moving picture, in the existing authoring system for preparing E-learning contents. Inevitably, it takes a very long time to prepare the contents. To solve this problem, the inventors hereof have proposed a system called "system for associating moving pictures with source documents" (Japanese Patent Application No. 2002-080500). This system automatically associates moving pictures with the source documents.

In any real lecture, the lecturer explains OHP contents one after another. The OHP pointer moves on the screen as the lecturer explains the OHP contents. In the case of the E-learning content of picture-content synchronization type, only the OHP switching in the moving picture is detected, thereby switching the OHP display. This cannot enable the lecturer to call the students' attention to that part of the OHP content that he or she is talking about.

The students can pay attention to that part of the OHP content which the lecturer is talking about, only if the part of the OHP content is pointed while the OHP content is being displayed in synchronism with the moving picture. To achieve this, the pointer position that the lecturer designates at the OHP must be detected in the moving picture (i.e., video-frame image) during the process of preparing the above-mentioned content.

The following are known as apparatuses for detecting the pointer position:

(1) Apparatus that Uses a Pointer Stick:
(a) Method in which a pointer stick is used, and the image of the stick and the shade of the stick, both photographed with a vide camera, are extracted to determine the pointing position (see, for example, Patent Document 1)
(b) Method in which a light-emitting pointer stick is used and a light beam of a specific wavelength is extracted to determine the pointing position (see, for example, Patent Document 2)

(2) Apparatus that Uses a Laser Pointer:
(a) Method in which a laser pointer is used, and each video frame is synchronized with the blinking of the laser beam to determine the image-projected area and the pointing position (see, for example Patent Document 3)
(b) Method in which a laser pointer is used, and a device that renders the projected image exactly as large as the photographed image is employed to determine the pointing position from the difference between the projected image and the photographed image (see, for example, Patent Document 4)
(c) Method in which a laser pointer is used, and a device that renders the projected image exactly as large as the photographed image is employed to determine the coordinates of the pointing marker on the screen from a light beam of a specific wavelength, from the blinking of a specific cycle, from a particular polarized light beam or from the difference between the projected image and the photographed image (see, for example, Patent Document 5)
(d) Method in which a laser pointer is used, an infrared-ray pointer is used to point the reference marker and pointing marker, both on the screen, and the positions of these markers are determined via an infrared-ray filter, thereby to determine the coordinates of the pointing marker (see, for example, Patent Document 6).

[Patent Document 1]
Jpn. Pat. Appln. Publication No. 8-320921

[Patent Document 2]
Jpn. Pat. Appln. Publication No. 10-83246

[Patent Document 3]
Jpn. Pat. Appln. Publication No. 8-331667

[Patent Document 4]
Jpn. Pat. Appln. Publication No. 9-62444

[Patent Document 5]
Jpn. Pat. Appln. Publication No. 9-80372

[Patent Document 6]
Jpn. Pat. Appln. Publication No. 11-85395

The method (1) that uses a pointer stick is disadvantageous in that the lecturer can hardly deliver a good lecture. Since the lecturer uses the stick, his or her face turns. This does not meet the requirement that the lecturer's face be photographed in close-up mode in the content.

The method (2) that uses a laser pointer requires high cost, for the following reasons.

In the method (a), there must be used a special laser pointer that blinks in synchronism with video frames and a special device that capture the blinking cycle of the laser pointer and video images at the same time.

In the method (b), it is necessary to use a special device for performing video projection and the video photographing at the same time and a device for rendering the projected image exactly as large as the photographed image.

In the method (c), a device for rendering the projected image exactly as large as the photographed image must be used as in the method (b).

In the method (d), a reference marker and a pointing marker must be displayed on the screen by applying an infrared ray. The method (d) therefore requires a special laser pointer and a special projector.

In the conventional technique of detecting a pointer position:
(1) Special devices and a special environment required in order to detect a laser-pointer position from the video image of the laser pointer;
(2) A special device must be used to detect the pointer position from the image projected by a projector and to convert the pointer position to the coordinates in the source content or associate the pointer position with the coordinates.
(3) The projected image must be photographed in its entirety, always within the camera frame (or a device for photographing the image in this manner must be used). Therefore, the projected image cannot be zoomed in, and the camera cannot be moved up or down, or from the left to the right or vice versa to photograph only a part of the projected image.

SUMMARY OF THE INVENTION

The present invention has been made to solve the problem described above. An object of the invention is to provide an apparatus, method and program for detecting a pointer position, which can detect a laser pointer position from a video image at low cost without using special devices, the video image being one that has photographed by using ordinary apparatuses and devices, such as a personal computer, a projector, a laser pointer and a video camera.

Another object of this invention is to provide an apparatus, method and program for associating images, which can associate an OHP file (source document) used in, for example, a lecture with a moving picture and can clearly indicate any region of an OHP-projected image, pointed during the lecture, on the OHP file. Still another object of the invention is to provide a content-distributing server and a content-distributing method, which distribute contents, or such OHP files associated with moving pictures.

To solve the object described above, a pointer-region detecting apparatus for detecting an optical pointer region indicating a prescribed position in an OHP image, in a video-frame image obtained by photographing the OHP image. The apparatus comprises: an RGB-value acquiring section that acquires an RGB value in each pixel region of a video-frame image; a candidate pointer-region extracting section that extracts, as candidate pointer regions, pixel regions that satisfy a prescribed formulas in which the RGB values acquired by the RGB-value acquiring section are used as variables; and a pointer-region determining section that determines that, of the pixel regions extracted as candidate pointer regions by the candidate pointer-region extracting section, one pixel region that has the highest value is the pointer region.

In the apparatus, the prescribed formulas are $R \geq 230$ and $3R-2G-B \geq 155$, and the highest value is given as $3R-2G-B$.

Another pointer-region detecting apparatus according to this invention is designed to detect an optical pointer region indicating a prescribed position in an OHP image, in a video-frame image obtained by photographing the OHP image. This apparatus comprises: an RGB-value acquiring section that acquires an RGB value in each pixel region of a video frame image; a binary-image generating section that generates a binary image from the RGB value acquired by the RGB-value acquiring section and in accordance with whether the hue satisfies a prescribed formula; a candidate-region extracting section that extracts a plurality of candidate regions from the binary image, by using labeling; a background-color calculating section that calculates a background color by using each region, except those parts which include the candidate regions in the video-frame image; an average-color calculating section that calculates an average color of each candidate pointer region by using the candidate region part in each candidate region of the video-frame image; and a pointer-region determining section that uses color data and determines whether the candidate pointer region is a pointer region, on the basis of the average-color distribution of the candidate pointer regions with respect to the background color.

In this pointer-region detecting apparatus, the candidate-region extracting section obtains a circumscribed rectangle for a pattern acquired by the labeling, produces a plurality of groups of circumscribed rectangles existing around the circumscribed rectangle and at prescribed distances from the circumscribed rectangle, and uses each group as a candidate region. Further, in the pointer-region detecting apparatus, the candidate-region extracting section uses, as the candidate region, a region obtained by expanding each group outwards by a predetermined number of pixels.

In the pointer-region detecting apparatus according to this invention, the background-color calculating section performs color labeling on the video image in a region extracted by the candidate-region extracting section, and obtains an average color for a background region that is a label region having a maximum area in the region excluding the pattern region.

In the pointer-region detecting apparatus according to this invention, the average-color calculating section calculates the average color of each region including each candidate region in the video-frame image, and extracts, as candidate pointer regions, pixels having the average color and not exceeding a prescribed threshold value, and calculating an average color of the candidate pointer regions.

In the pointer-region detecting apparatus according to the invention, the pointer-region determining section determines whether the candidate pointer region is a pointer region, in accordance with whether the distribution of the average color that the background-color calculating section has calculated for the background color coincides with the color distribution that a laser pointer has with respect to the background color.

In the pointer-region detecting apparatus according to this invention, color-distribution tables for the laser pointer are further provided, each for one background color.

Still another pointer-region detecting apparatus according to this invention is designed to detect an optical pointer region indicating a prescribed position in an OHP image, in a video-frame image obtained by photographing the OHP image. This apparatus comprises: an RGB-value acquiring section that acquires an RGB value in each pixel region of a video-frame image; a binary-image generating section that generates a binary image from the RGB value acquired by the RGB-value acquiring section and in accordance with whether the hue satisfies a prescribed formula; a candidate-region extracting section that extracts a plurality of candidate regions from the binary image, by using labeling; an average-color calculating section that calculates an average color of each candidate region that includes the plurality of candidate regions in the video-frame image; a candidate pointer-pattern extracting section that extracts candidate pointer patterns from each candidate region, by using the average color; an elliptical-shape calculating section that calculates an elliptical shape by using the envelope of the pointer pattern; and a pointer-region determining section that uses the shape and determines whether the candidate pointer pattern is a laser-pointer region, on the basis of the ratio of the area of the elliptical shape to the area occupied by the pixels that form the pointer pattern.

In the pointer-region detecting apparatus according to the invention, the candidate pointer-pattern extracting section extracts, as pointer pattern, a pattern that contains pixels having the average color and not exceeding a prescribed threshold value.

In the pointer-region detecting apparatus according to this invention, the pointer-region determining section examines, in the elliptical shape, odd-numbered rasters and even-numbered rasters, compares the number of odd- or even-numbered rasters with the number of all pixels existing on the rasters, and determines that pointer region is a laser pointer if the ratio of the rasters to all pixels is equal to or greater than a predetermined value.

A pointer-region detecting method according to the present invention is designed to detect an optical pointer region indicating a prescribed position in an OHP image, in a video-frame image obtained by photographing the OHP image. The method comprises: an RBG-value acquiring step of acquiring an RGB value in each pixel region of a video-frame image; a candidate pointer-region extracting step of extracting, as candidate pointer regions, pixel regions that satisfy a prescribed formulas in which the RGB values acquired in the RGB-value acquiring step are used as variables; and a pointer-region determining step of determining that, of the pixel regions extracted as candidate pointer regions in the step of extracting the candidate pointer-region, one pixel region that has the highest value is the pointer region.

A pointer-region detecting method according to the present invention is designed to detect an optical pointer region indicating a prescribed position in an OHP image, in a video-frame image obtained by photographing the OHP image. The method comprises: an RBG-value acquiring step of acquiring an RGB value in each pixel region of a video frame; a binary-image generating step of generating a binary, image from the RGB value acquired in the RBG-value acquiring step, in accordance with whether the hue satisfies a prescribed formula; a candidate-region extracting step of extracting a plurality of candidate regions from the binary image, by using labeling; a background-color calculating step of calculating a background color by using each region, except those parts which include the candidate regions in the video-frame image; an average-color calculating step of calculating an average color of each candidate pointer region by using the candidate region part of each candidate region in the video-frame image; and a pointer-region determining step of determining, by using the color data, whether the candidate pointer region is a pointer region, on the basis of the average-color distribution of the candidate pointer regions with respect to the background color.

Still another pointer-region detecting method according to this invention is designed to detect an optical pointer region indicating a prescribed position in an OHP image, in a video-frame image obtained by photographing the OHP image. This method comprises: an RGB-value acquiring step of acquiring an RGB value in each pixel region of a video-frame image; a binary-image generating step of generating a binary image from the RGB value acquired in the RGB-value acquiring step and in accordance with whether the hue satisfies a prescribed formula; a candidate-region extracting step of extracting a plurality of candidate regions from the binary image, by using labeling; an average-color calculating step of calculating an average color of each candidate region that includes the plurality of candidate regions in the video-frame image; a candidate pointer-pattern extracting step of extracting candidate pointer patterns from each candidate region, by using the average color; an elliptical-shape calculating step of calculating an elliptical shape by using the envelope of the pointer pattern; and a pointer-region determining step of using shape data and determining whether the candidate pointer pattern is a laser-pointer region, on the basis of the ratio of the area of the elliptical shape to the area occupied by the pixels that form the pointer pattern.

A pointer-region detecting program according to the present invention is to be executed by a computer to detect an optical pointer region indicating a prescribed position in an OHP image, in a video-frame image obtained by photographing the OHP image. The program describes: an RBG-value acquiring step of acquiring an RGB value in each pixel region of a video-frame image; a candidate pointer-region extracting step of extracting, as candidate pointer regions, pixel regions that satisfy a prescribed formulas in which the RGB values acquired in the RGB-value acquiring step are used as variables; and a determining step of determining that, of the pixel regions extracted as candidate pointer regions in the step of extracting the candidate pointer-region, one pixel region that has the highest value is the pointer region.

Another pointer-region detecting program according to this invention is to be executed by a computer to detect an optical pointer region indicating a prescribed position in an OHP image, in a video-frame image obtained by photographing the OHP image. This program describes: an RBG-value acquiring step of acquiring an RGB value in each pixel region of a video frame; a binary-image generating step of generating a binary image from the RGB value acquired in the RBG-value acquiring step, in accordance with whether the hue satisfies a prescribed formula; a candidate-region extracting step of extracting a plurality of candidate regions from the binary image, by using labeling; a background-color calculating step of calculating a background color by using each region, except those parts which include the candidate regions in the video-frame image; an average-color calculating step of calculating an average color of each candidate pointer region by using the candidate region part of each candidate region in the video-frame image; and a pointer-region determining step of determining, by using the color data, whether the candidate pointer region is a pointer region, on the basis of the average-color distribution of the candidate pointer regions with respect to the background color.

A pointer-region detecting program according to the invention is to be executed by a computer to detect an optical pointer region indicating a prescribed position in an OHP image, in a video-frame image obtained by photographing the OHP image. This program describes: an RGB-value acquiring step of acquiring an RGB value in each pixel region of a video-frame image; a binary-image generating step of generating a binary image from the RGB value acquired in the RGB-value acquiring step and in accordance with whether the hue satisfies a prescribed formula; a candidate-region extracting step of extracting a plurality of candidate regions from the binary image, by using labeling; an average-color calculating step of calculating an average color of each candidate region that includes the plurality of candidate regions in the video-frame image; a candidate pointer-pattern extracting step of extracting candidate pointer patterns from each candidate region, by using the average color; an elliptical-shape calculating step of calculating an elliptical shape by using the envelope of the pointer pattern; and a pointer-region determining step of using shape data and determining whether the candidate pointer pattern is a laser-pointer region, on the basis of the ratio of the area of the elliptical shape to the area occupied by the pixels that form the pointer pattern.

An image-associating apparatus according to this invention comprises: a pointer-region detecting section that detects an optical pointer region indicating a prescribed position in an OHP image, in a video-frame image obtained by photographing the OHP image; an image-associating section that associates the OHP image photographed in the video-frame image, with an OHP file that is the source document of the OHP image; and a pointer-region associating section that associates the optical pointer region detected by the pointer-region detecting section, with the region of the OHP file associated by the image-associating section.

In the image-associating apparatus, the pointer-region associating section associates the optical pointer region detected by the pointer-region detecting section, with the region of the OHP file that is the source document of the OHP image, on the basis of the character data in the OHP image and the character data in the OHP file, the OHP image existing in a region that is associated with the region detected by the pointer-region detecting section.

In the image-associating apparatus, the image-associating section associates the number of a video frame with the page number of the OHP file, and the pointer-region associating section associates the optical pointer region detected by the pointer-region detecting section, as coordinates in the OHP file.

Further, in the image-associating apparatus, the pointer-region associating section associates the region in the OHP file, with the pointer region, so that the region associated is displayed in highlight mode.

Another image-associating method according to the present invention comprises: a pointer-region detecting step of detecting an optical pointer region indicating a prescribed position in an OHP image, in a video-frame image obtained by photographing the OHP image; an image-associating step of associating the OHP image photographed in the video-frame image, with an OHP file that is the source document of the OHP image; and a pointer-region associating step of associating the optical pointer region detected by the pointer-region detecting step, with the region of the OHP file associated in the image-associating step.

An image-associating program according to the invention is to be executed by a computer to associate a video frame with an OHP file corresponding to an OHP image photographed in a video-frame image. The program describes: a pointer-region detecting step of detecting an optical pointer region indicating a prescribed position in the OHP image, in a video-frame image obtained by photographing the OHP image; an image-associating step of associating the OHP image photographed in the video-frame image, with an OHP file that is the source document of the OHP image; and a pointer-region associating step of associating the optical pointer region detected by the pointer-region detecting step, with the region of the OHP file associated in the image-associating step.

A content-distributing server according to this invention comprises: a video-image storing section that stores a video image; an OHP-file storing section that stores an OHP file that is the source document of the OHP image photographed in the video image; an association-data storing section that associates the frame number of-the video image, with the page number of the OHP file corresponding to the OHP image photographed in the video image, and stores association data that associates the optical pointer region shown in the OHP image photographed in the video image, with the region of the OHP file; and a transmitting section that transmits the OHP-file image associated with the video-frame image and the data about the optical pointer region in the OHP file.

A content-distributing method according to the present invention is designed to distribute contents between the content-distributing server and a client connected to the server. The method comprises: a content-requesting step in which the client requests that the content-distributing server should distribute a designated content; a content-transmitting step in which the content-distributing server retrieves the designated content from a storage section and transmits a corresponding video image, an OHP file associated with the video image and the data representing a pointer position in the OHP file; and a displaying step in which the client reproduces the video data from the distributed content, and displays the OHP-file image synchronized with a video frame and the data representing the pointing position in the OHP file.

DETAILED DESCRIPTION OF THE PREFERRED EMBODIMENTS

An embodiment of the present invention will be described, with reference to the accompanying drawings.

Figure 1:
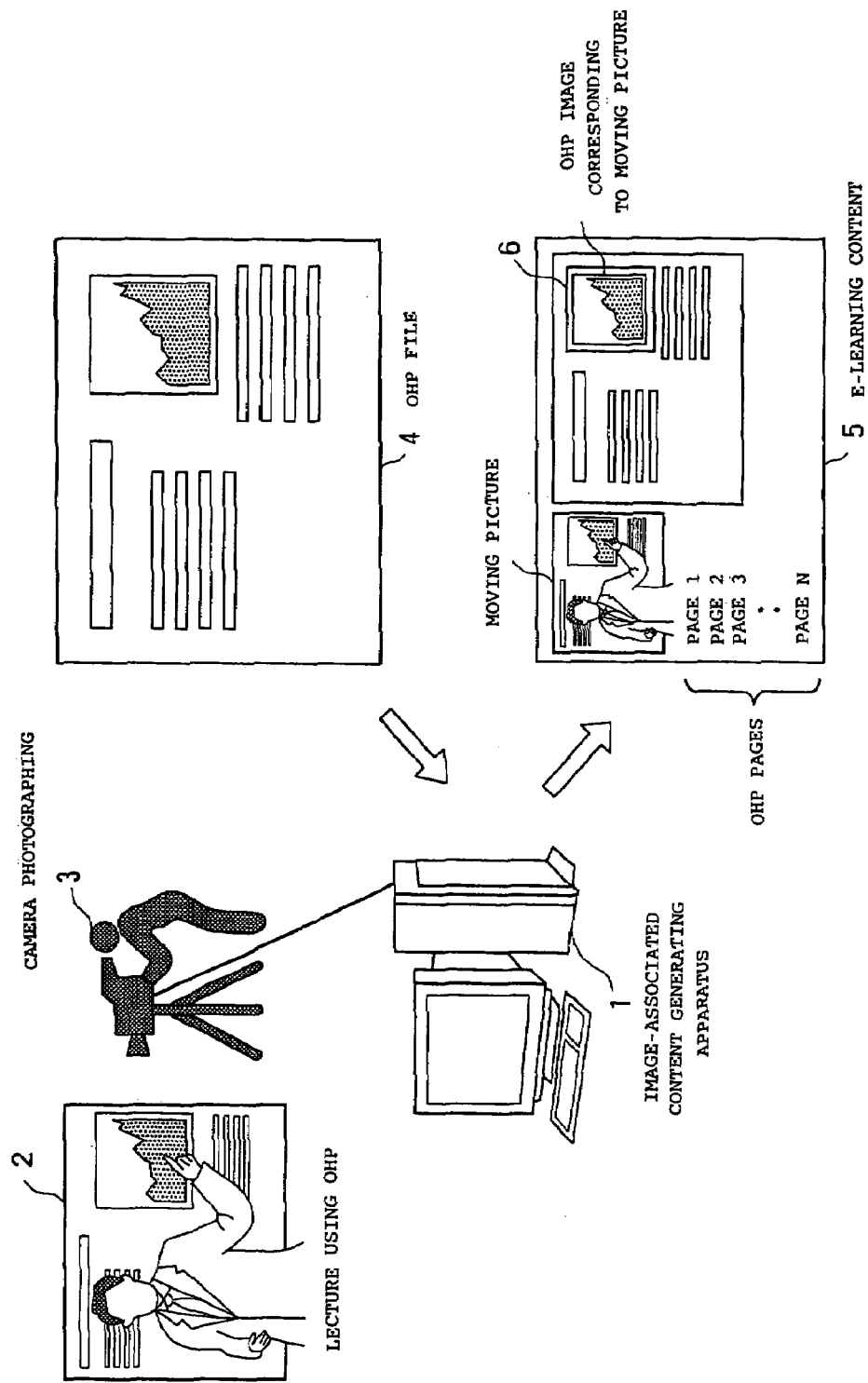
FIG. 1 is a diagram illustrating the concept of an embodiment of the present invention.

FIG. 1 is a diagram illustrating the concept of the embodiment of the invention. A lecture 2 employing a laser pointer and an OHP may be used as E-learning material. In this case, a moving picture is taken of the lecture 2, by using a movie camera 3 (video camera). The resultant video data is stored in an image-associated content generating apparatus 1 that is constituted by, for example, a personal computer. The OHP file 4 used in the lecture is stored in the same apparatus (i.e., image-associated content generating apparatus 1). In the image-associated content generating apparatus 1, various image-processing techniques are carried out, determining the OHP-switch timing in the moving picture. It is also determined to which frame of the moving picture corresponds to the original OHP image. Further, the coordinates of those parts of the OHP image, which the lecturer has pointed during the lecture, are obtained, thereby preparing a coordinate table. Using the coordinate table, the OHP image is synchronized with the moving picture and an E-learning content 5 is generated. The E-learning content 5 is used to display the region 6 pointed by the lecturer, in highlight mode. Thus, the moving picture can be automatically associated with the pages of the OHP file, the pointed position data (hereinafter called "pointer region") can be automatically extracted, and the highlight-mode display can be automated. In the following description, the term "image" denotes a color image.

Figure 2:
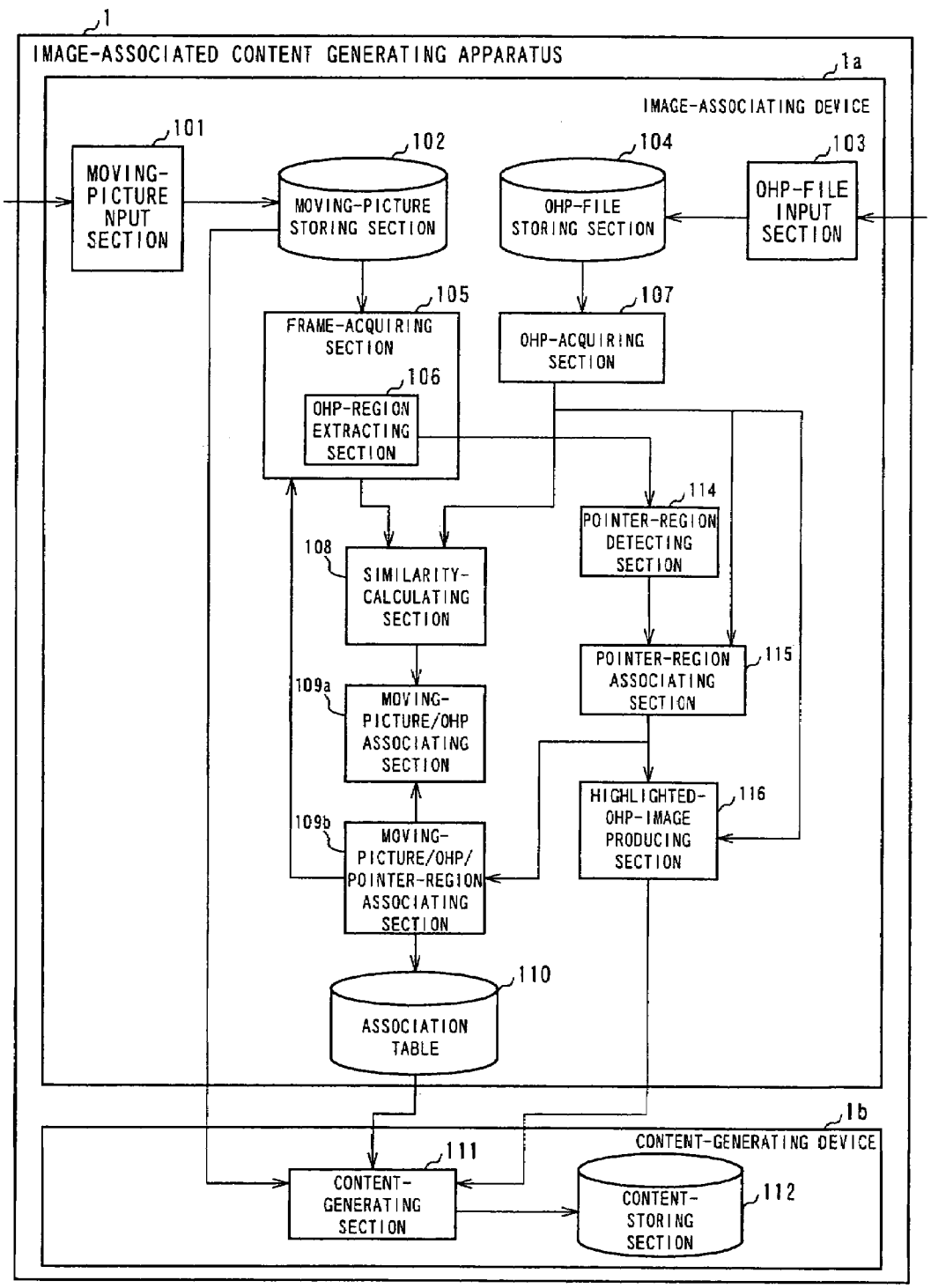
FIG. 2 is a diagram showing the function configuration of an image-associated content generating apparatus.

FIG. 2 is a diagram showing a function configuration that the image-associated content generating apparatus 1 may have. As FIG. 2 shows, the image-associated content generating apparatus 1 comprises an image-associating device 1a and a content-generating device 1b. The image-associating device 1a has a moving-picture input section 101, a moving-picture storing section 102, an input section 103, an OHP-file storing section 104, a frame-acquiring section 105, an OHP-region extracting section 106, an OHP-acquiring section 107, a similarity-calculating section 108, and a moving-picture/OHP associating section 109a. The moving-picture input section 101 inputs a moving picture of the lecture, taken by a photographing device such as a camera. The moving-picture storing section 102 stores the input moving picture in the AVI (Audio Visual Interleave) format or the like. The input section 103 inputs an OHP file (i.e., an image file and the character data corresponding to the image file) supplied from another computer system or the like. The OHP-file storing section 104 stores the pages of the input OHP file, one by one. The frame-acquiring section 105 acquires frame images, one by one, from the moving picture stored in the moving-picture storing section 102. The OHP-region extracting section 106 extracts an OHP region from a frame image (i.e., the image of a video frame). The OHP-acquiring section 107 acquires the OHP file stored in the OHP-file storing section 104. The similarity-calculating section 108 calculates the similarity of the OHP file acquired by the OHP-acquiring section 107 with the part of the OHP in the frame image extracted by the OHP-region extracting section 106. The moving-picture/OHP associating section 109a associates a moving-picture frame with a page of the OHP file on the basis of the similarity calculated by the similarity-calculating section 108.

The image-associated content generating apparatus 1 further comprises a pointer-region detecting section 114, a pointer-region associating section 115, an OHP-image producing section 116, a moving-picture/OHP/pointer-region associating section 109b, and an association table (table-storing section) 110. The pointer-region detecting section 114 detects a pointer region from the image of the frame associated with a page of the OHP file by means of the moving-picture/OHP associating section 109a. The pointer-region associating section 115 associates the pointer region detected by the pointer-region detecting section 114, with a position in the OHP-file image acquired from the OHP-acquiring section 107. (Namely, the section 115 sets the pointer region of the OHP image in a frame image, on the image of the OHP file.) The OHP-image producing section 116 has a highlight display that displays an OHP image in highlight mode. The moving-picture/OHP/pointer-region associating section 109b generates association data for associating a moving-picture frame and the region of the optical pointer displayed in the moving picture, with the OHP file and a region in the OHP file, on the basis of the results of association performed by the moving-picture/OHP associating section 109a and the results of association performed by the pointer-region associating section 115. The association table (table-storing section) 110 stores the association data in the form of a table.

The content-generating device 1b comprises a content-generating section 111 and a content-storing section 112. The content-generating section 111 refers to the association table 110 and generates a content for E-learning from a frame image and an OHP file image that are associated with each other. The content-storing section 112 stores the content generated by the content-generating section 111.

The OHP-image producing section 116, which is provided in the image-associating device 1a as described above, may be provided in the content-generating section 111.

Figure 3:
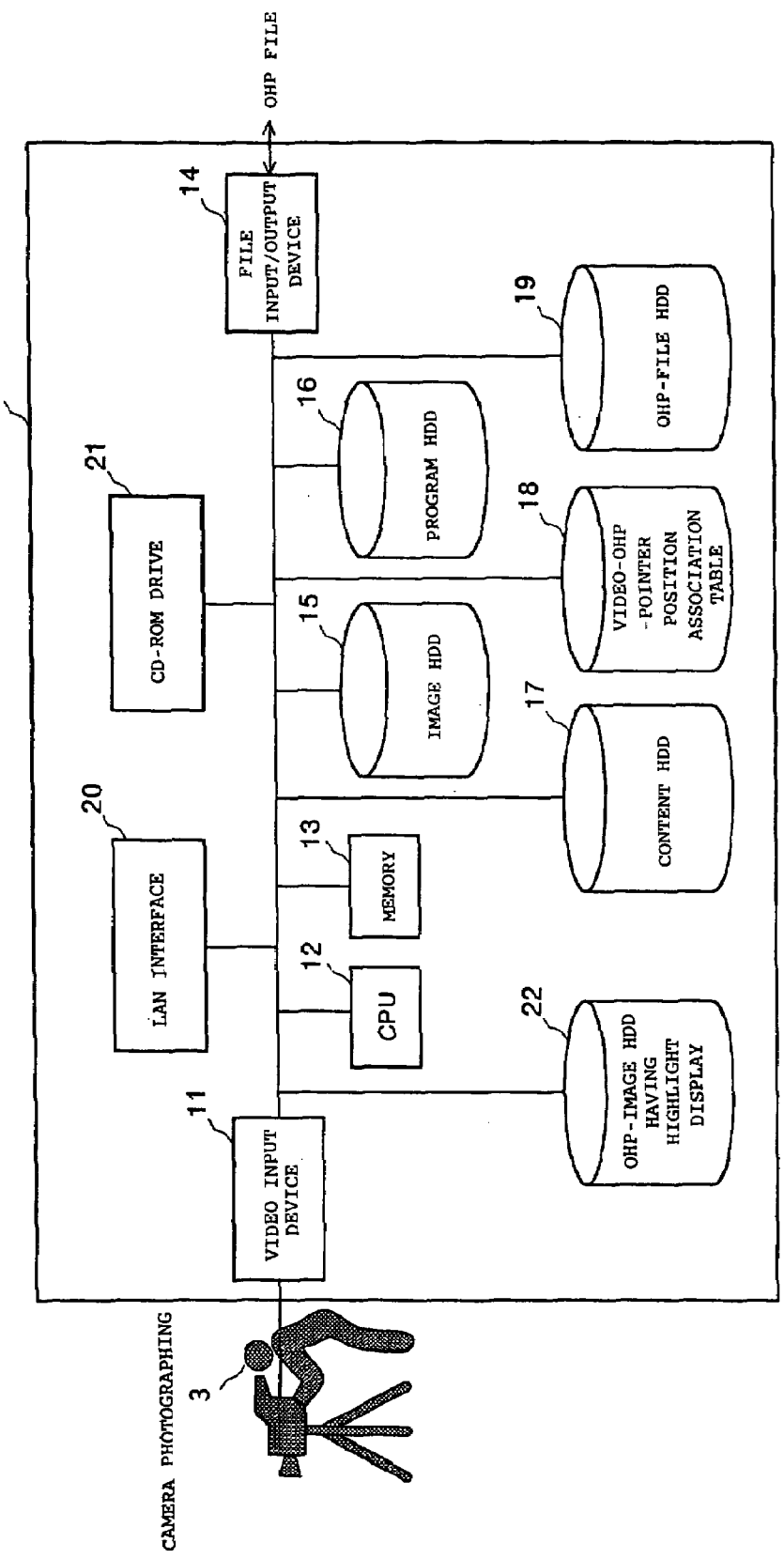
FIG. 3 is a diagram depicting the hardware configuration of the image-associated content generating apparatus.

FIG. 3 is a diagram depicting the hardware configuration of the image-associated content generating apparatus 1. As FIG. 3 shows, the image-associated content generating apparatus 1 comprises a video input device 11, a CPU (Central Processing Unit) 12, a memory 13, an image HDD (Hard Disk Drive) 15, a file input/output device 14, a program HDD 16, a content HDD 17, an association-table (video-OHP-pointer position association table) HDD 18, an OHP-file HDD 19, a LAN (Local Area Network) interface 20, a CD-ROM drive 21, and an OHP-image HDD 22 having a highlight display.

In this embodiment, the function blocks illustrated in FIG. 2 that shows the function configuration are programs stored in the program HDD 16 (FIG. 3), which are developed in the memory 13 when the image-associated content generating apparatus 1 is activated. The CPU 12 executes these function blocks. Nonetheless, as the moving-picture input section 101 or the OHP file input section 103, both shown in FIG. 2, the video input device 11 and the file input/output device 14, both shown in FIG. 3, operate in cooperation with the program developed in the above-mentioned memory 13. The moving-picture storing section 102 is constituted by the image HDD 15. The OHP-file storing section 104 is constituted by the OHP-file HDD 19. The association table 110 is constituted by the association-table HDD 18. The content-storing section 112 is constituted by the content HDD 17. The OHP-image HDD 22 that has a highlight display may be provided as a content in the content HDD 17.

The programs described above may be stored not in the program HDD 16. They may be stored in, for example, a computer-readable medium such as a portable storage medium, i.e., a CD-ROM, an FD, a magnetic disc, a DVD disc, an optomagnetic disc or an IC card. Alternatively, the programs may be developed in the database that holds other computer programs, in other computers or in the database incorporated therein and may then be executed. Still alternatively, the programs may be downloaded from a transfer medium on the line, developed in the memory 13 and executed. The mode of installing the programs is not limited to a specific one. As indicated above, the present embodiment has a CD-ROM drive 21. This makes it possible to read data from portable storage media. The LAN interface 20 or the file input/output device 14 can easily download the programs from other computers or databases through the LAN or the like.

Figure 4:
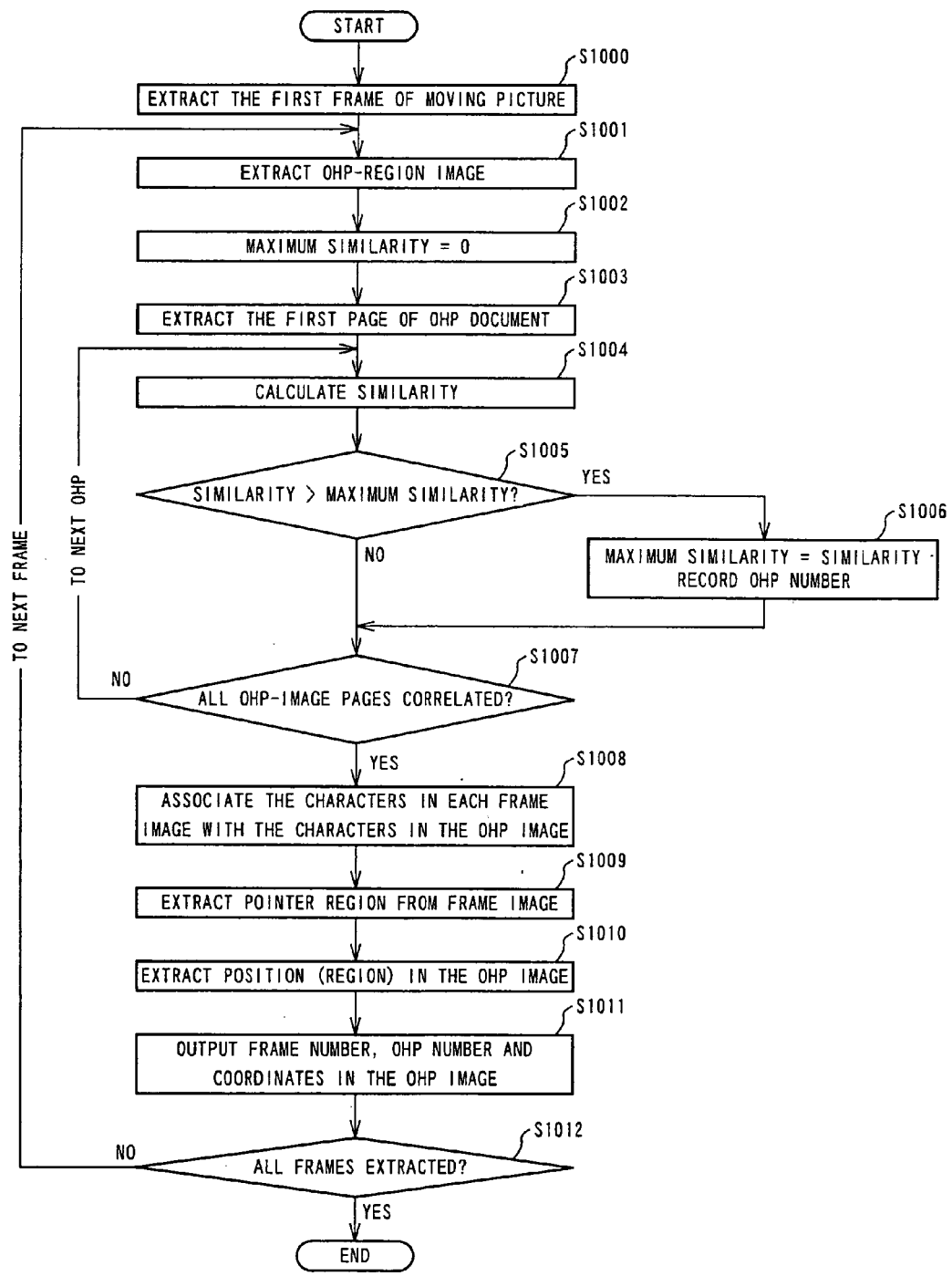
FIG. 4 is a flowchart illustrating the, process that the apparatus performs to associate the contents with the images.

The process that the image-associating device 1a performs will be explained in detail, with reference to flowcharts. FIG. 4 is a flowchart illustrating the entire process of associating contents with images. First, the frame-acquiring section 105 acquires the first frame of a moving picture from the moving-picture storing section 102 (S1000). The OHP-region extracting section 106 retrieves and extracts a region of the frame image, in which an OHP image displayed (S1001). (Hereinafter, this region will be referred to as "OHP-region image"). The process of extracting the OHP region will be described below in detail.

Figure 5:
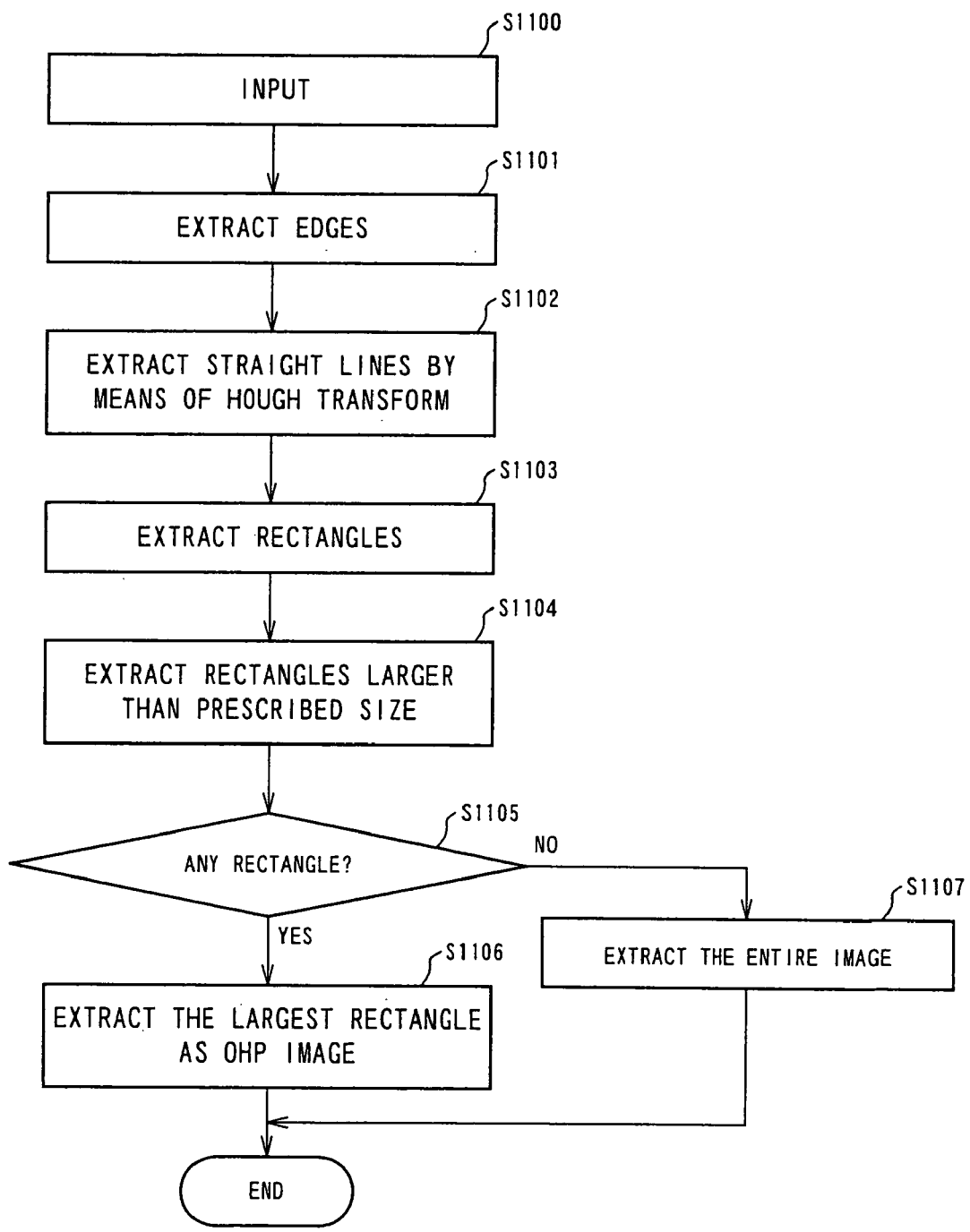
FIG. 5 is a flowchart illustrating the process of extracting an OHP-region image.

FIG. 5 is a flowchart illustrating the process of extracting an OHP-region image. At first, the data representing a frame image is input to the OHP-region extracting section 106 (S1100). Next, the frame-image data is converted to binary data, from which the edges in the frame image are extracted (S1101). The Hough transform is performed on the edges thus extracted, thereby detecting straight lines (S1102). The straight-line components detected are integrated, forming rectangles (S1103). Of the rectangles thus formed, only those smaller than a prescribed size are extracted (S1104). If no rectangles are not extracted (if NO in S1105), it is determined that the entire frame image is the region of the OHP image. In this case, the entire image is extracted (S1107). If rectangles are extracted (if YES in S1105), the largest rectangle extracted is extracted as OHP-region image (S1106).

In most moving pictures of lectures performed by using OHPs, the OHP image is the largest rectangle. This is why the region of the OHP image is extracted in Step S1106.

After the region of the OHP image is extracted, the maximum similarity is set to 0 as initial value (S1002, FIG. 4). Subsequently, the OHP-acquiring section 107 extracts the first page of the OHP image from the OHP-file storing section 104 (S1003). The similarity-calculating section 108 correlates the first page of the OHP image, which has been extracted in Step S1003, with the OHP-region image of the frame, which has been extracted in Step S1001, thereby calculating the similarity between the first page and the OHP-region image (S1004). How the similarity is calculated will be explained in detail.

Figure 6:
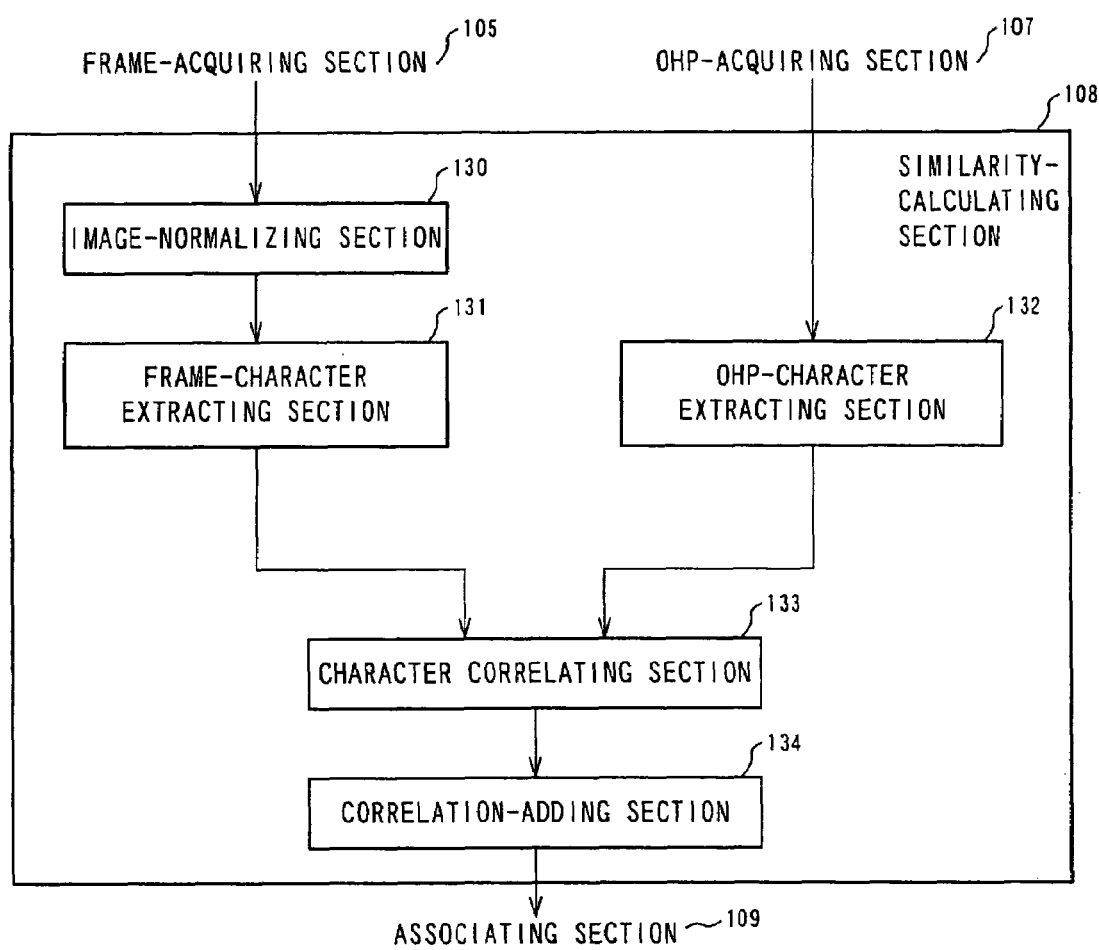
FIG. 6 is a diagram showing the function configuration of a similarity-calculating section that finds similarity from character data.

FIG. 6 is a diagram showing the function configuration of the similarity-calculating section 108 and illustrating a method of calculating the similarity. In this method, character data is used to find the similarity. More precisely, it is determined whether two consecutive characters are identical or not, in order to calculate the similarity. As FIG. 6 depicts, the similarity-calculating section 108 comprises an image-normalizing section 130, a frame-character extracting section 131, an OHP-character extracting section 132, a character correlating section 133, and a correlation-adding section 134. The image-normalizing section 130 performs a rotation process on the OHP-region image extracted from the frame image, correcting the inclination of the OHP-region image and thereby orientating it in the same direction as the OHP image. If the OHP-region image differs in size from the OHP image, the image-normalizing section 130 magnifies the OHP-region image, thus correcting it to the same size as the OHP image. Such a normalization process may be carried out by the OHP-region extracting section 106 in step S1106 shown in FIG. 5. The process is not limited to a particular one.

The frame-character extracting section 131 recognizes characters in the OHP-region image extracted in Step S1106 (FIG. 5) and extracts the characters from the OHP-region image. The OHP-character extracting section 132 extracts the characters in the page extracted by the OHP-acquiring section 107. In the present embodiment, the characters represented by the character data acquired from the OHP image need not be recognized. This is because the OHP-file storing section 104 has stored the image file for each page and the character data corresponding to the image file. Hence, the characters can be extracted, only if the OHP-file storing section 104 is referred to. The character correlating section 133 correlates the characters extracted by the frame-character extracting section 131, with the characters extracted by the OHP-character extracting section 132. The correlation-adding section 134 first converts the results of the correlation performed by the section 133, into numerical values, and then adds the numerical values. The sum of the numerical value is the similarity.

Figure 7:
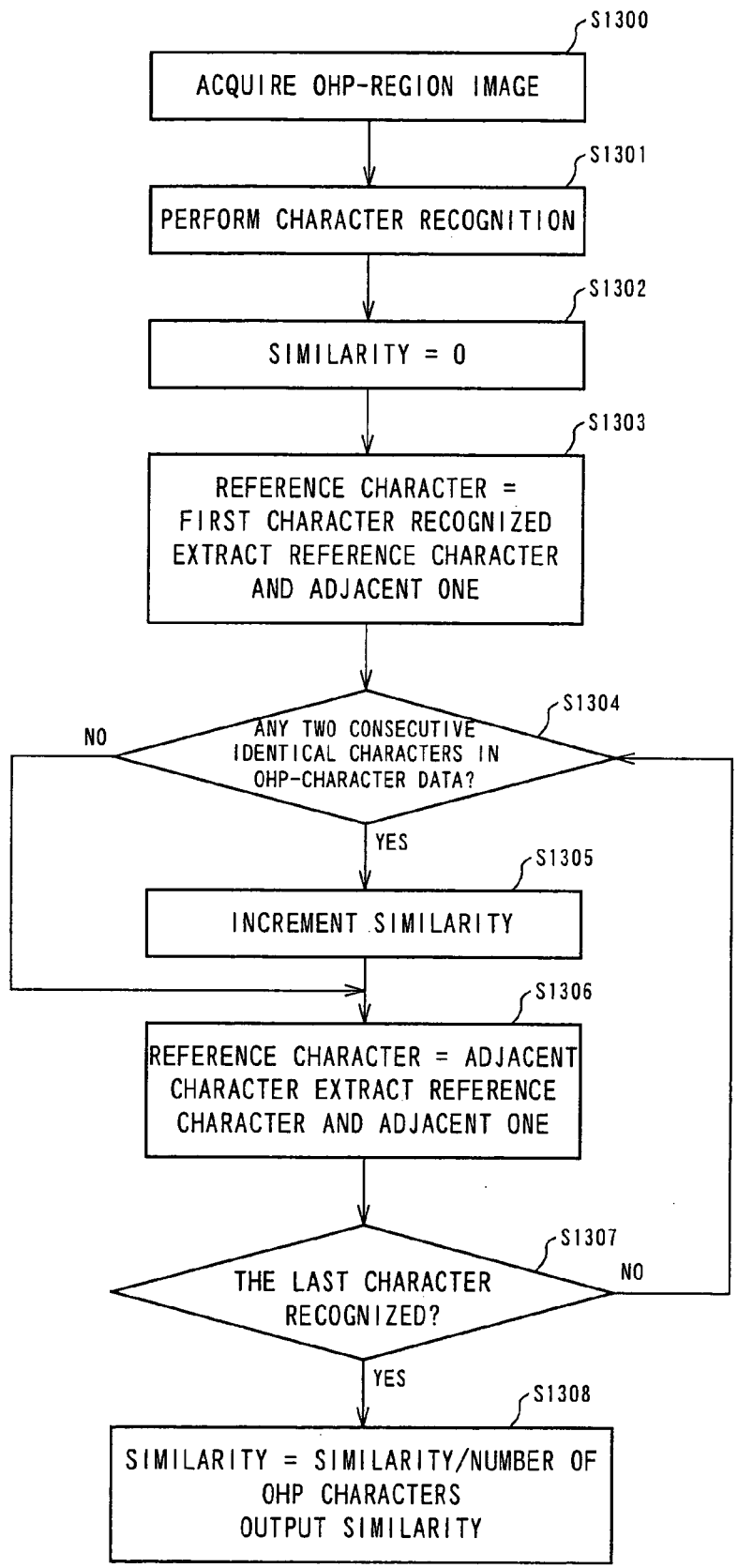
FIG. 7 is a flowchart explaining the similarity calculation performed by the similarity-calculating section shown in FIG. 6.
Figure 8:
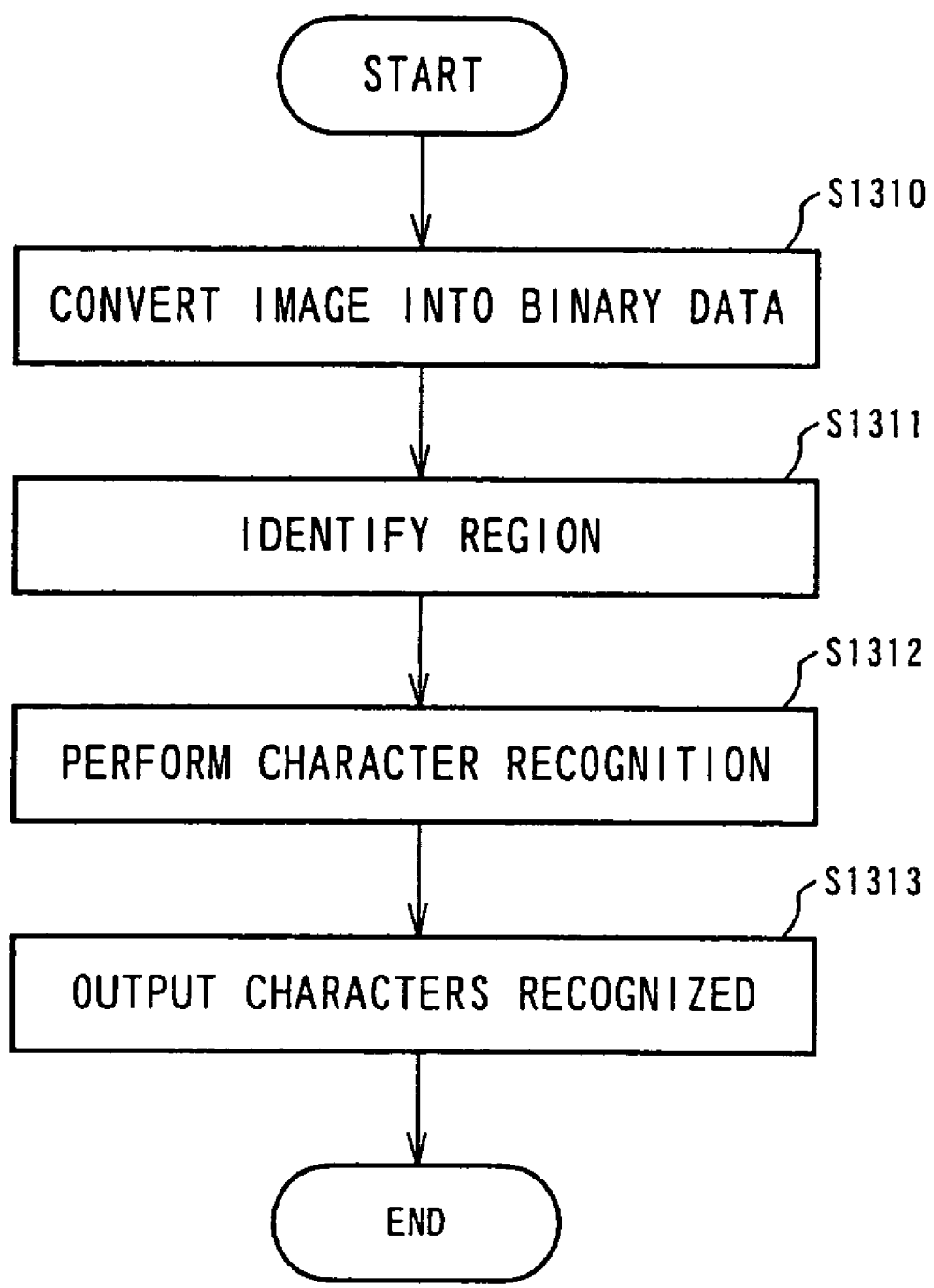
FIG. 8 is a flowchart showing the character-recognizing process in detail.

FIG. 7 is a flowchart that explains the similarity calculation performed by the similarity-calculating section 108. First, the section 108 acquires the OHP-region image from the frame-acquiring section 105 (S1300). In the section 108, the frame-character extracting section 131 carries out character recognition (S1301). The character recognition is accomplished by utilizing a known technique. FIG. 8 is a flowchart showing the character recognition in detail. At first, the OHP-region image is converted into binary data (S1310). The region is identified in accordance with the binary data (S1311). Next, character recognition is carried out (S1312). The characters recognized are output in the form of text data (S1313).

After the character recognition is performed, the initial value for the similarity is set to 0 (S1302, FIG. 7). Then, the first character that the frame-character extracting section 131 has recognized is set as reference character. The OHP-character extracting section 132 extracts two consecutive characters, the first character being one that corresponds to the reference character set in the OHP image, and the second character being one that is adjacent to the first character (S1303). The character correlating section 133 correlates the characters extracted by the frame-character extracting section 131, with the characters extracted by the OHP-character extracting section 132, determining whether the two consecutive characters are identical. If the characters are identical (if YES in S1304), the correlation-adding section 134 increments the similarity (S1305). If the characters are not identical (if NO in S1304), the section 134 will not increment the similarity. Then, the character next to the reference character is set and correlated with the reference character in the same manner as mentioned above (S1306). Steps S1304 to S1306 are repeated until the last character recognized is found to be identical with the reference character (if YES in S1307). As a result, the correlation-adding section 134 corrects the similarity as indicated below (S1308):

Similarity=Similarity/the number of OHP characters

The calculation of similarity may be achieved by using image data (pixel signals) or layout data (region-attributes such as figures, tables, character-train blocks and coordinate data), in addition to the character data. Alternatively, the calculation may be accomplished by using both the character data, the image data and the layout data.

The similarity-calculating section 108 described above calculates the similarity that the OHP-region image of a frame has with respect to all OHP images. More specifically, after the similarity of the first page of the OHP image is calculated (S1004), the similarity is set to the maximum value if the similarity is higher than the highest similarity (set to 0, at first) (that is, if YES in S1005). The page number assigned to the OHP image is recorded (S1006). If all pages of the OHP image have not been correlated (if NO in S1007), the next page of the OHP image is extracted, and the calculation of similarity is repeated in Step S1004. If all pages of the OHP image have not been correlated (if YES in S1007), the characters in each frame image area are associated with the characters in the OHP image (S1008) in order to associate the position that the laser pointer assumes in the frame image (to be extracted later), with the position of the OHP. In the present embodiment, this process of associating the characters in each frame can be omitted. This is because the characters generated in the above-mentioned calculation of similarity have been associated with the characters in the OHP image. If no character data has been prepared for the OHP image, it is necessary not only to calculate the similarity, but also to associate the characters. For example, the frame image may be subjected to character recognition, so that trains of character codes may be obtained. Apart from this, the OHP image is subjected to character recognition, thus providing trains of character codes, and two trains of character codes are matched, code by code, in the descending order of character codes. This code matching is carried out by means of the known DP matching or the like.

Next, the pointer region is detected (or extracted) from the frame image (S1009). The pointer-region detecting section 114 shown in FIG. 2 performs the extraction of the pointer region. The pointer-region detecting section according to this invention is constituted by a pointer-region detecting section that carries out the process that will be described, by using a computer and software. One step that the pointer-region detecting section 114 performs is to acquire a frame image (S1401). Then, of the points that meet the following specific conditions in terms of the RBG value of the frame image, the point that exhibits the greatest 3R-2G-B is obtained, thereby to extract the pointer region.

$R \geq 230$, and $3R-2G-B \geq 155$ (Conditions)

Figure 9:
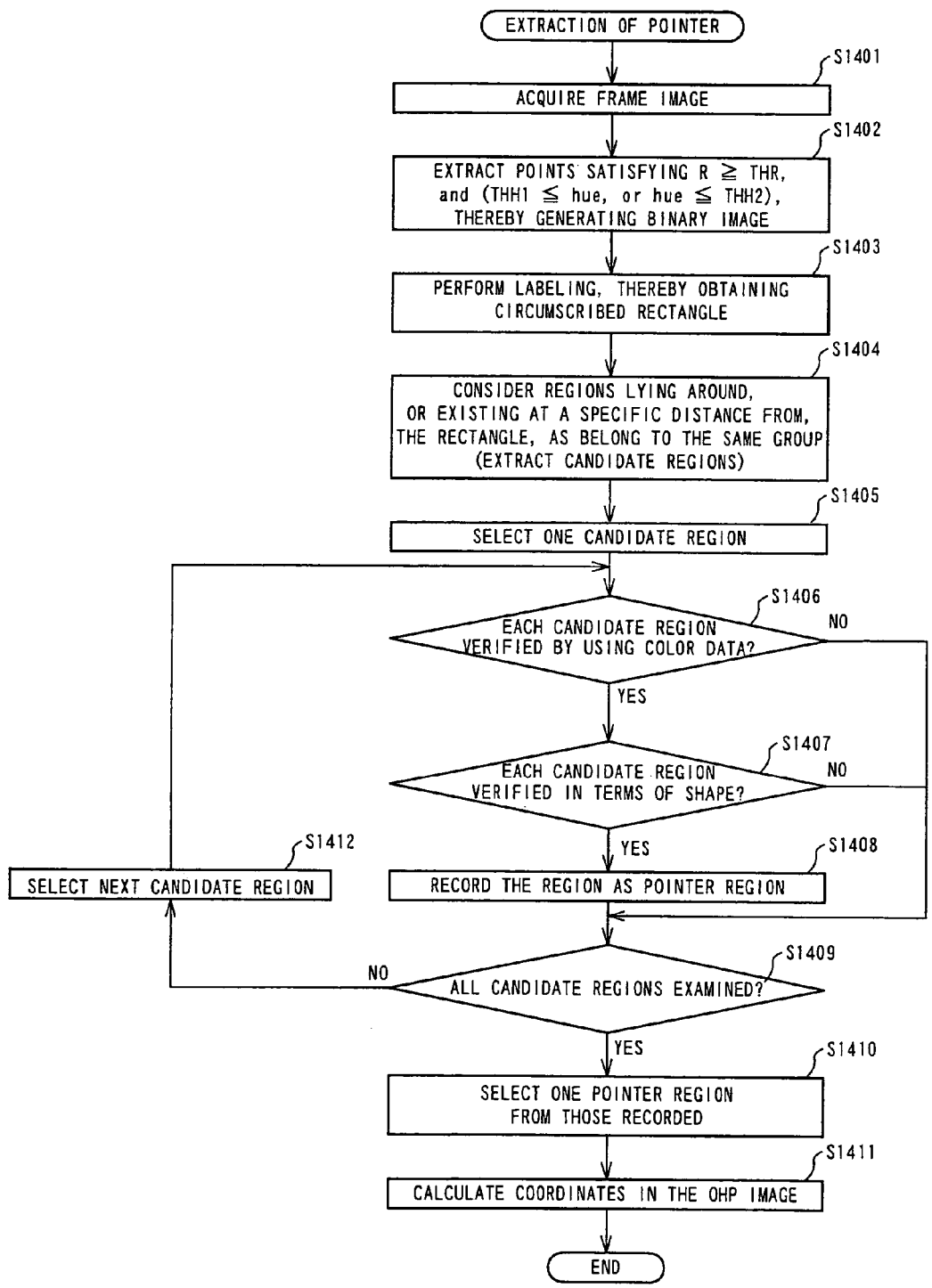
FIG. 9 is a flowchart depicting the process performed by a pointer-region detecting section.
Figure 13:
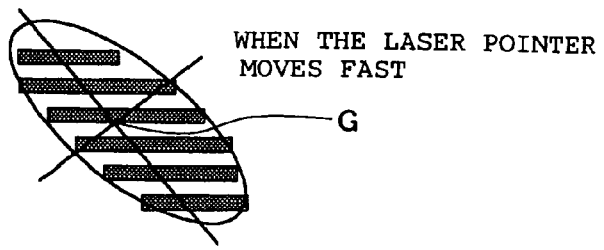
FIG. 13 is a diagram depicting an image pattern for the laser pointer, which is observed when the laser pointer moves fast.

Another step that the section 114 performs is to carry out the process (FIG. 9) on the frame image, thereby to find such a center G of gravity of the pointer region as is illustrated in FIG. 13. At first, a frame image is acquired (S1401). Then, points that satisfy the conditions of the following formula (1) are extracted, thereby to generate a binary image (S1402).

$R \geq THR$, and $(THH1 \leq hue$, or $hue \leq THH2)$ (1)

Subsequently, a labeling process is carried out, obtaining a circumscribed rectangle (S1403). The regions that lie around, or exist at a specific distance from, the rectangle obtained in Step S1403, are considered as belong to the same group as the rectangle, and are extracted as candidates (S1404).

Steps S1406 to S1409, which will be described below, are performed on each candidate region (S1405, S1412).

First, each candidate region is verified by using color data (S1406). Next, the candidate region is verified in terms of shape (S1407). If the candidate region is verified in both color and shape, it is recorded as a pointer region (S1408). When Steps 1406, 1407 and 1408 are performed on all candidate regions (YES in S1409), one of the regions recorded is selected (S1410). Then, the coordinates in the OHP image are calculated (S1411). In the present embodiment, the pointer region is verified in terms of both color and shape. The pointer region may be verified in only color or shape, nonetheless. When the region is verified in both color and shape, the accuracy of verification increases, but it takes much time to perform the calculation for verification. If the region is verified in color or shape only, the calculation ends in a short time, though the accuracy of verification decreases.

Figure 10:
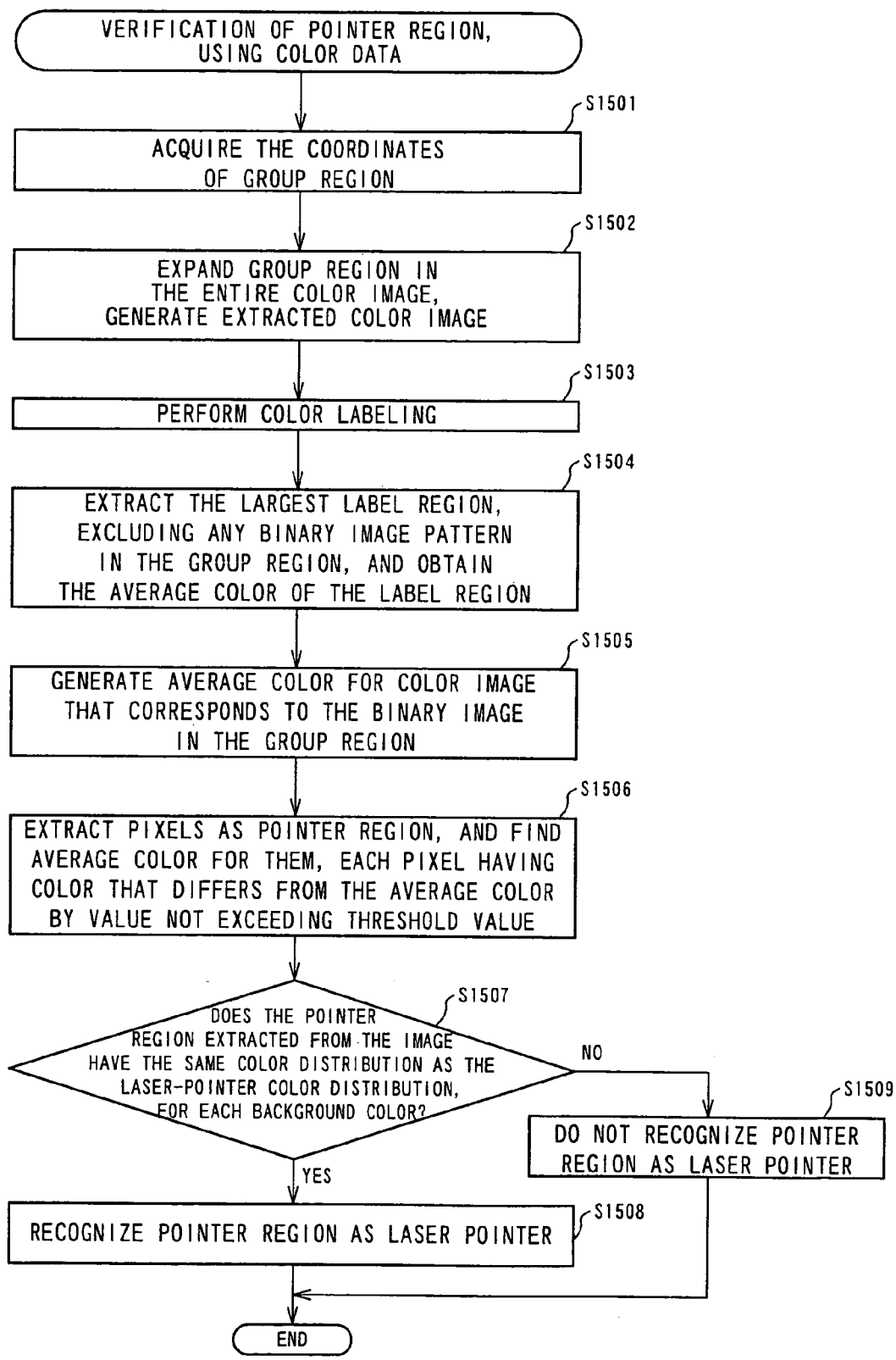
FIG. 10 is a flowchart explaining the process of verifying the pointer region by using color data.

A process of verifying the pointer region in terms of color will be explained, with reference to FIG. 10. In this process, the background color and the average color of candidate pointer regions are obtained, and it is determined whether the combination of the background color and the average color corresponds to any one of prescribed combinations. Thus, each candidate is determined to be a laser-pointer region or not.

Figure 11:
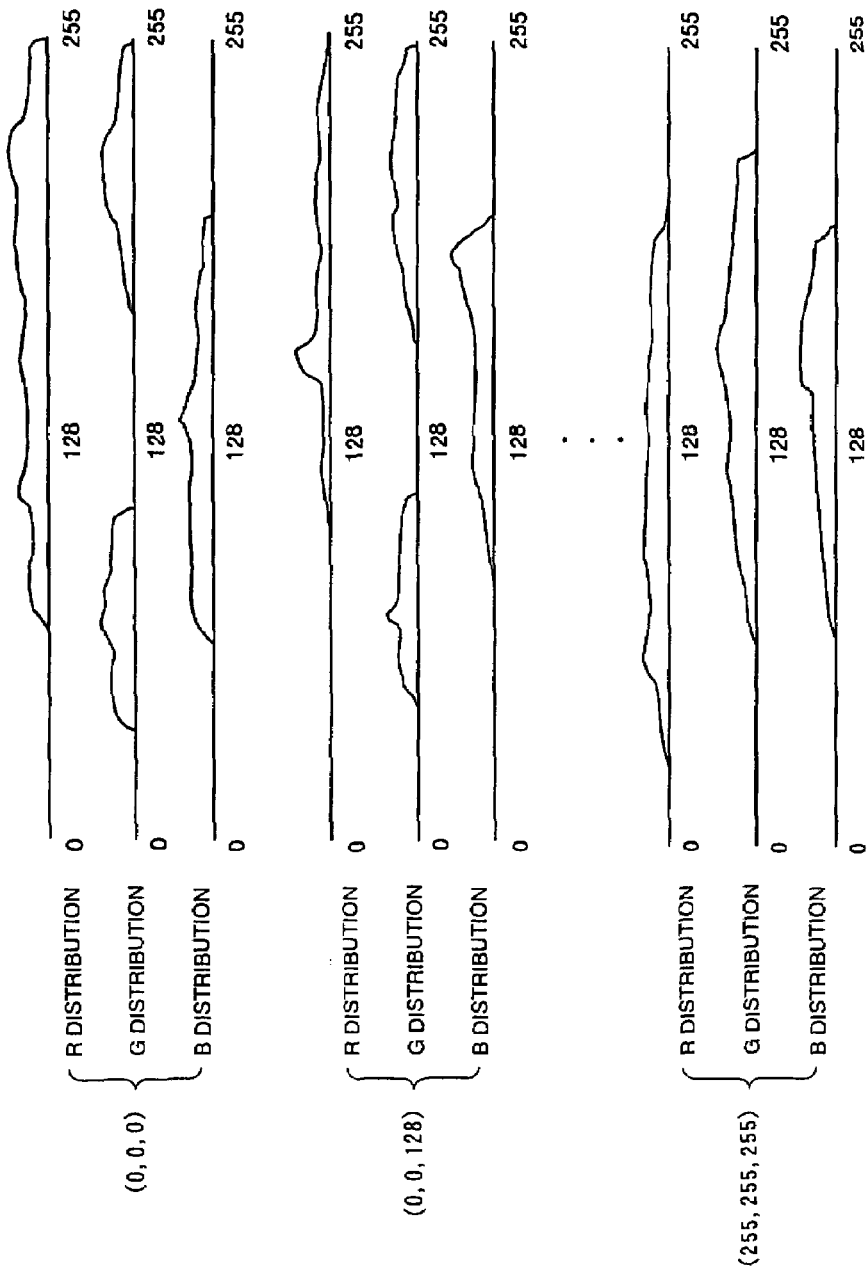
FIG. 11 is a diagram showing the color (RGB) distribution of a laser pointer, for each of the background color (RGB)

First, the coordinates of the group region obtained in Step S1404 is calculated (S1501). Then, the first process of determining the background color is performed. That is, the group region is expanded in the entire color image (namely, it is expanded outwards by a predetermined number of pixels), generating an extracted color image (S1502). Then, color labeling is carried out (S1503). The largest label region, excluding any pattern in the form of a binary image existing in the group region, is extracted as background, and the average color of the label region is obtained (S1504). Next, the second process of finding the average color for a laser-pointer region is performed, generating the average color for a color image that corresponds to the binary image in the group region (S1505). Then, pixels, each having a color that differs from the average color by a value not exceeding a threshold value, are extracted as pointer region from the group region, and an average color is obtained for these pixels extracted (S1506). The results of the first and second processes are combined, thereby determining whether the color distribution in the pointer region extracted from the image coincides with the color-distribution table shown in FIG. 11, which represents the color distribution that the laser pointer may have for each background color (S1507). If the color distribution coincides with the color-distribution table, the pointer region is recognized as laser pointer region (S1508). If color distribution does not coincide with the color-distribution table, the pointer region is not recognized as laser pointer region (S1509).

Figure 12:
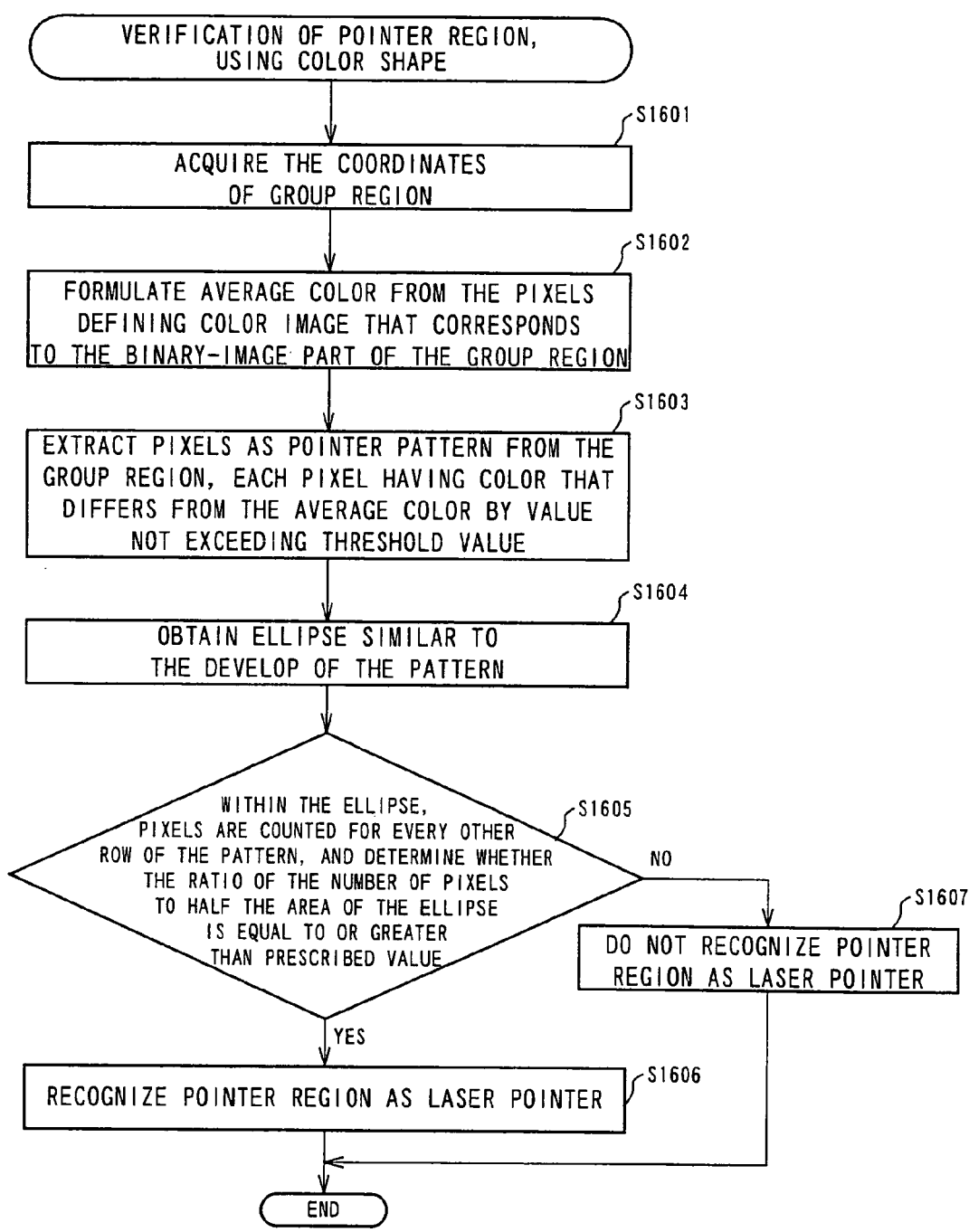
FIG. 12 is a flowchart explaining the process of verifying the pointer region by using shapes.

The process of verifying the pointer region by using shapes will be explained, with reference to FIG. 12. At first, the coordinates of the group region are acquired (S1601). Then, a new group region is used, which has been prepared by expanding the group region obtained in Step S1404 by a predetermined number of pixels. An average color is thereby formulated from the pixels defining a color image that corresponds to the binary-image part of the group region (S1602).

Next, one of the binary-image patterns extracted in Step S1402, which exists in the group region, is examined. An average color (Rm, Gm, Bm) is then obtained for a point in the color image (frame image), which has the coordinates identical to those of this pattern. The pixels, each having a color that differs from the average color by a value not exceeding a threshold value, are extracted as pointer pattern from the same group region (S1603). In other words, a pattern having a color similar to the average color is extracted from the group region. For example, all pixels that meet the condition of the following formula (2) are extracted:

$$|Ri-Rm|+|Gi-Gm|+|Bi-Bm|<Th\_dist \qquad (2)$$

In the formula (2), (R1, Gi, Bi) is a fixed threshold value prescribed for the RBG value Th_dist of pixel i that exists in the group region.

An elliptical envelope is obtained, which encompasses all pixels extracted is obtained. That is, an ellipse similar to the envelope of the pattern is obtained (S1604).

Figure 14:
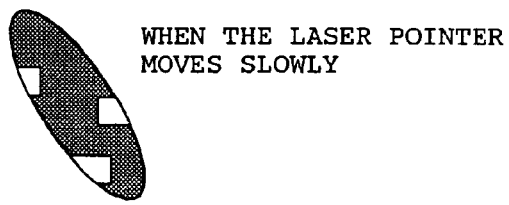
FIG. 14 is a diagram showing an image pattern for the laser pointer, which is observed when the laser pointer moves slowly.

The beam emitted from the laser pointer may be applied to the screen, and the video camera may photograph the screen having the beam spot on it. In the image thus obtained, such a laser-pointer pattern as shown in FIGS. 13 and 14 is observed in the image, as the laser pointer (or the camera) is moved. FIG. 13 depicts a laser-pointer pattern that is observed when the laser pointer moves fast. This is because the interlace is performed when photographing video images, therefore the laser pointer shifts during interlace scanning time. FIG. 14 shows a laser-pointer pattern that is observed when the laser pointer moves slowly. Any missing part of the laser-pointer pattern indicates a position where the laser pointer could not be extracted. In such a case, an elliptical envelope is obtained, which defines the envelope illustrated in FIG. 13 or FIG. 14.

The elliptical envelope is obtained by the following methods (1) to (d).
(a) A variance-covariance matrix is formed from the vectors of all black pixels in the group region, assuming that the coordinates of each black pixel are a vector.
(b) A specific value and specific vector are obtained from the variance-covariance matrix.
(c) The centers of gravity of the black pixels are determined, a direction is found from the two specific vectors that have the highest and second highest contributing degrees, respectively, and two axes intersecting with each other at right angles are determined from the centers of gravity. Four points are obtained, which are at distances (a and b), each distance being four times the standard deviation, from the midpoints on these axes (=centers of gravity). Then, an ellipse that passes these four points.
(d) Segments a and b of an axis of the ellipse are gradually shortened at the same rate, until either contacts a black pixel for the first time.

In the area within the ellipsis, odd-numbered rasters are examined, and even-numbered rasters are examined independently of the odd-numbered one. For each group of rasters, the ratio of black pixels extracted in Step S1603 to all pixels is determined (S1605). If the ratio is equal to or greater a predetermined value, the pointer region is recognized as laser pointer (S1606). Otherwise, the pointer region is not recognized as laser pointer (S1607).

The process of selecting one region in Step S1410 (shown in FIG. 9) will be described.

A plurality of pointer regions may be generated from one frame image and subsequently recorded. Since the lecturer has pointed one region, one pointer region must be selected from those recorded. One of the candidate regions is selected as pointer region. The candidate region so selected is one having more pixels than any other, which have been extracted as pointer region from the group region (in Step S1506) and each of which has a color different from the average color by a value not exceeding a threshold value.

After the pointer region is extracted, the process of extracting a position in the OHP image, which is shown in FIG. 4, is carried out (S1010).

Figure 15A:
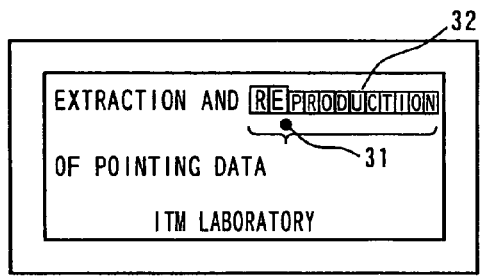
FIGS. 15A and 15B illustrate the concept of a process of associating a pointer region in a moving picture with an OHP image, FIG. 15A showing a frame image of a moving picture, and FIG. 15B showing an OHP image (bit map)
Figure 15B:
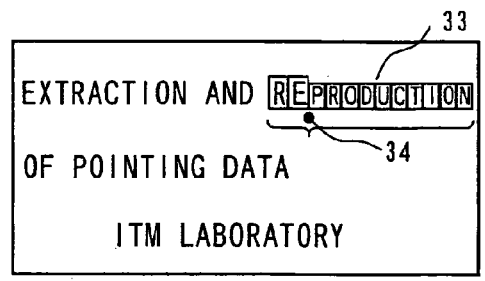

When the laser-pointer position in the frame image is extracted, the coordinates in the OHP image, which correspond to the laser-position, are inferred in order to display the content of E-learning. To infer the coordinates, the following method is employed as will be described below with reference to FIGS. 15A and 15B.
(a) First, the pointer position 31 is determined in the frame image shown in FIG. 15A.
(b) Then, one or more characters 32 are selected, which exist near the pointer position in the frame image, and the positional relation between the pointer 31 and the characters 32 is calculated and recorded.
(c) Next, an OHP slide (PPT slide) shown in FIG. 15B, which is associated with the frame image, is obtained, and characters 33 recorded in Step (b) are selected from those that exist in the OHP slide.
(d) The pointer position 34 in the OHP slide is inferred from the characters 33 selected, by using the relative positional relation described above.

As a result, a pointer-coordinate table of the OHP numbers for frames and the pointer coordinates in the OHP slide is generated (S1011, FIG. 4). (This table, i.e., Table 1, shows the association of the frame numbers, the OHP numbers for the frames, and the coordinates for the pointers in the OHP image.)

TABLE 1

| | |
|---|---|
| Frame number 0: | OHP number 0, (−1, −1) |
| Frame number 1: | OHP number 0, (−1, −1) |
| Frame number 2: | OHP number 0, (60, 51) |
| Frame number 3: | OHP number 1, (75, 44) |
| Frame number 4: | OHP number 1, (78, 50) |
| Frame number 5: | OHP number 5, (81, 51) |
| Frame number N − 1: | OHP number 10, (34, 96) |
| Frame number N: | OHP number 10, (−1, −1) |

The coordinate values may not be absolute coordinates as indicated in Table 1. Rather, they may be represented in percentage of the height and width of the image displayed. The value "−1", i.e., one coordinate, means that a beam emitted from the laser pointer is not applied to the screen.

When the associating process, shown in FIG. 4, ends, the content-generating device 1b generates an E-learning content that corresponds to pointing data. The process of generating an E-learning content will be explained below, as a process of generating images for WBT (Web-based Training) display.

Figure 16:
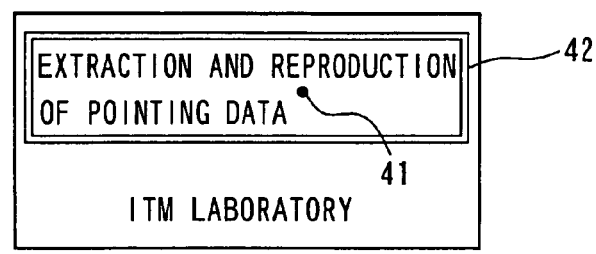
FIG. 16 shows an OHP image displayed in highlight mode.

This process of generating contents generates an HTML file, i.e., a WBT content that represents the contents of Table 2, which will be described later. One the simplest examples of this process will be described, with reference to FIG. 16.

An image, in which a part near the pointer 41 is displayed in highlight mode in the OHP image is generated from the coordinates of the pointer in the OHP image. To be more specific, a region 42 such as a character train, a text box, a figure or a table is obtained directly from the PPT file that is an OHP slide. (Alternatively, a region near the pointer is obtained by performing layout analysis on the OHP image.) An image is produced, which pertains to the region thus obtained and which is framed with lines of conspicuous color such as red. This image is given a name that is an OHP-number name_index number. (This number may be incremented from 1, but does not exceed the OHP number). Any image that has a coordinate value of "−1" is not displayed in highlight mode and given a name that is an OHP-number name only.

Of the highlight regions generated by scanning Table 1 from the top, any one region identical in coordinates to the preceding highlight region is given the same name as the preceding one. As a result, there is prepared Table 2 presented below. (Table 2 shows the association of the frame numbers, the OHP numbers, pointer coordinates in OHP and image numbers.)

TABLE 2

| | |
|---|---|
| Frame number 0: | OHP number 0, (−1, −1), image name = 0 |
| Frame number 1: | OHP number 0, (−1, −1), image name = 0 |
| Frame number 2: | OHP number 0, (60, 51), image name = 0_1 |
| Frame number 3: | OHP number 1, (75, 44), image name = 1_1 |
| Frame number 4: | OHP number 1, (78, 50), image name = 1_1 |
| Frame number 5: | OHP number 5, (81, 51), image name = 5_1 |
| Frame number N − 1: | OHP number 10, (34, 96), image name = 10_1 |
| Frame number N: | OHP number 10, (−1, −1), image name = 10 |

Table 2 is scanned from the top. If any two adjacent entries (rows) are identical in both OHP number and image name, these entries are integrated. Table 3 (WBT contents) presented below is thereby generated, in which OHP numbers are used as keys.

TABLE 3

OHP number 0, frame numbers 0~1, image name = 0
OHP number 0, frame numbers 2~2, image name = 0_1
OHP number 1, frame numbers 3~4, image name = 1_1
OHP number 5, frame numbers 5~5, image name = 5_1
OHP number 10, frame number N − 1~N − 1, image name = 10_1
OHP number 10, frame number N~N, image name = 10

This table is the core part of the HTML file of the WBT content for use in E-learning. Only while the table is displayed in an inter-frame period, the image corresponding to it is displayed in highlight mode. This enables the lecturer to display the detailed OHP image that contains the pointing data representing the position indicated by using the laser pointer.

The coordinate value of the pointer displayed in the OHP image for each frame can be extracted by some methods other than the above-described method. Thus, the coordinate value may be displayed in place of the pointer, in the OPH image. For example, the image of an OHP number may be displayed for a period in which the OHP number remains unchanged, and the coordinate value may be displayed in the form of a large arrow or a large red dot.

Figure 17:
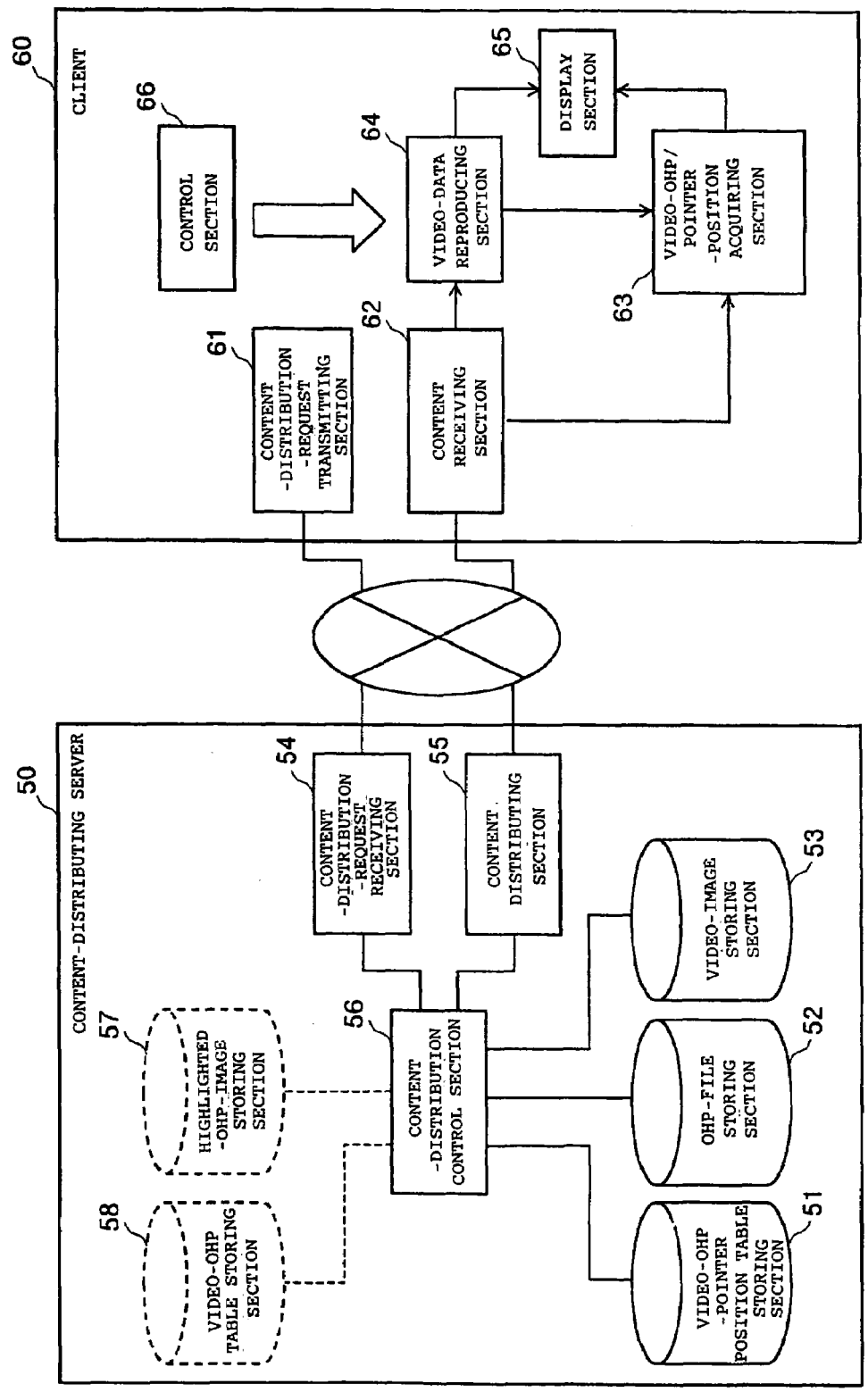
FIG. 17 is a block diagram showing the configuration of a content-distributing server and the configuration of a client.

FIG. 17 is a block diagram showing a content-distributing server 50 and a client 60. The content-distributing server 50 is configured to distribute contents. The client 60 receives the contents from the content-distributing server 50.

The content-distributing server 50 comprises various storage devices, such as a video-OHP-pointer position table storing section 51, an OHP-file storing section 52, a video-image storing section 53, a video-OHP table storing section 58, and a highlighted-OHP-image storing section 57. The content-distributing server 50 further comprises a content-distribution-request receiving section 54, a content distributing section 55, and a content-distribution control section 56.

On the other hand, the client 60 comprises a content-distribution-request transmitting section 61, a content receiving section 62, a video-data reproducing section 64, a video-OHP/pointer-position acquiring section 63, a display section 65, and a control section 66. The control section 66 controls the other components of the client 60.

How the content-distributing server 50 and client 60 operate will be described.

(1) The user operates the client, instructing that the content he or she has designated be displayed. The client requests that the server should distribute the content designated by the user.

(2) The content server searches the storage devices for the designated content in the storage devices, reads the content and transmits the content to the client. The content includes a video image, an OHP file synchronized with the video image and pointer-position data contained in the OHP file. The OHP file may be one to be displayed in highlight mode, or one not to be displayed in highlight mode.

(3) The client reproduces the video data from the content distributed to it and displays the OHP (slide) synchronous with the video frame and the pointing-position data in the OHP.

As has been described in detail, the embodiment of this invention is advantageous in some respects. The conventional authoring system for preparing E-learning contents cannot automatically synchronize a moving picture explaining the OHP with the OHP image displayed in the picture. Nor can it automatically indicates which part of the OHP image the lecturer is talking about, if the lecturer uses a point tool such as a laser pointer. To synchronize the OHP image and the moving picture and to display the pointer data representing the position pointed by the lecture, people must spend much time to prepare contents that may display the pointer data. The embodiment of this invention can not only automatically synchronize the OHP image and the moving picture, but also automatically extract and reproduce the pointer data. Hence, it can automatically develop contents for use in E-learning.

As described above in detail, the present invention can provide an apparatus, method and program that can detect, without using special apparatuses, a pointer position in the video image photographed by using ordinary apparatuses such as a personal computer, a projector, a laser pointer and a video camera, at low cost. The invention can provide an apparatus, method and program for associating images, which can associate an OHP file (source document) used in, for example, a lecture with a moving picture of lecture, which can clearly indicate any region of an OHP-projected image, pointed during the lecture, on the OHP file. Further, the invention can provide a content-distributing server and a content-distributing method that can distribute, as contents, the moving picture and OHP file thus associated.

What is claimed is:

1. A pointer-region detecting apparatus that detects an optical pointer region indicating a prescribed position in an OHP image, in a video-frame image obtained by photographing the OHP image, the apparatus characterized by comprising:

an RGB-value acquiring section that acquires an RGB value in each pixel region of a video-frame image;

a candidate pointer-region extracting section that extracts, as candidate pointer regions, pixel regions that satisfy a prescribed formulas in which the RGB values acquired by the RGB-value acquiring section are used as variables; and a pointer-region determining section that determines that, of the pixel regions extracted as candidate pointer regions by the candidate pointer-region extracting section, one pixel region that has the highest value is the pointer region.

2. The pointer-region detecting apparatus according to claim 1, characterized in that the prescribed formulas are R≧230 and 3R-2G-B≧155, and the highest value is given as 3R-2G-B.

3. A pointer-region detecting apparatus for detecting an optical pointer region indicating a prescribed position in an OHP image, in a video-frame image obtained by photographing the OHP image, the apparatus characterized by comprising:

an RGB-value acquiring section that acquires an RGB value in each pixel region of a video frame image;

a binary-image generating section that generates a binary image from the RGB value acquired by the RGB-value acquiring section and in accordance with whether the hue satisfies a prescribed formula;

a candidate-region extracting section that extracts a plurality of candidate regions from the binary image, by using labeling;

a background-color calculating section that calculates a background color by using each region, except those parts which include the candidate regions in the video-frame image;

an average-color calculating section that calculates an average color of each candidate pointer region by using the candidate region part in each candidate region of the video-frame image; and a pointer-region determining section that uses color data and determines whether the candidate pointer region is a pointer region, on the basis of the average-color distribution of the candidate pointer regions with respect to the background color.

4. The pointer-region detecting apparatus according to claim 3, characterized in that the candidate-region extracting section obtains a circumscribed rectangle for a pattern acquired by the labeling, produces a plurality of groups of circumscribed rectangles existing around the circumscribed rectangle and at prescribed distances from the circumscribed rectangle, and uses each group as a candidate region.

5. The pointer-region detecting apparatus according to claim 4, characterized in that the candidate-region extracting section uses, as the candidate region, a region obtained by expanding each group outwards by a predetermined number of pixels.

6. The pointer-region detecting apparatus according to claim 4, characterized in that the background-color calculating section performs color labeling on the video image in a region extracted by the candidate-region extracting section, and obtains an average color for a background region that is a label region having a maximum area in the region excluding the pattern region.

7. The pointer-region detecting apparatus according to claim 3, characterized in that the average-color calculating section calculates the average color of each region including each candidate region in the video-frame image, and extracts, as candidate pointer regions, pixels having the average color and not exceeding a prescribed threshold value, and calculating an average color of the candidate pointer regions.

8. The pointer-region detecting apparatus according to claim 3, characterized in that the pointer-region determining section determines whether the candidate pointer region is a pointer region, in accordance with whether the distribution of the average color that the background-color calculating section has calculated for the background color coincides with the color distribution that a laser pointer has with respect to the background color.

9. The pointer-region detecting apparatus according to claim 8, characterized by further comprising color-distribution tables for the laser pointer, each provided for one background color.

10. A pointer-region detecting apparatus that detects an optical pointer region indicating a prescribed position in an OHP image, in a video-frame image obtained by photographing the OHP image, the apparatus characterized by comprising:

an RGB-value acquiring section that acquires an RGB value in each pixel region of a video-frame image;

a binary-image generating section that generates a binary image from the RGB value acquired by the RGB-value acquiring section and in accordance with whether the hue satisfies a prescribed formula;

a candidate-region extracting section that extracts a plurality of candidate regions from the binary image, by using labeling;

an average-color calculating section that calculates an average color of each candidate region that includes the plurality of candidate regions in the video-frame image;

a candidate pointer-pattern extracting section that extracts candidate pointer patterns from each candidate region, by using the average color;

an elliptical-shape calculating section that calculates an elliptical shape by using the envelope of the pointer pattern; and a pointer-region determining section that uses the shape and determines whether the candidate pointer pattern is a laser-pointer region, on the basis of the ratio of the area of the elliptical shape to the area occupied by the pixels that form the pointer pattern.

11. The pointer-region detecting apparatus according to claim 10, characterized in that the candidate-region extracting section obtains a circumscribed rectangle for a pattern acquired by the labeling, produces a plurality of groups of circumscribed rectangles existing around the circumscribed rectangle and at prescribed distances from the circumscribed rectangle, and uses each group as a candidate region.

12. The pointer-region detecting apparatus according to claim 10, characterized in that the candidate-region extracting section uses, as the candidate region, a region obtained by expanding each group outwards by a predetermined number of pixels.

13. The pointer-region detecting apparatus according to claim 10, characterized in that the candidate pointer-pattern extracting section extracts, as pointer pattern, a pattern that contains pixels having the average color and not exceeding a prescribed threshold value.

14. The pointer-region detecting apparatus according to claim 10, characterized in that the pointer-region determining section examines, in the elliptical shape, odd-numbered rasters and even-numbered rasters, compares the number of odd- or even-numbered rasters with the number of all pixels existing on the rasters, and determines that pointer region is a laser pointer if the ratio of the rasters to all pixels is equal to or greater than a predetermined value.

15. A pointer-region detecting method that detects an optical pointer region indicating a prescribed position in an OHP image, in a video-frame image obtained by photographing the OHP image, the method characterized by comprising:
   an RBG-value acquiring step that acquires an RGB value in each pixel region of a video-frame image;
   a candidate pointer-region extracting step that extracts, as candidate pointer regions, pixel regions that satisfy a prescribed formulas in which the RGB values acquired in the RGB-value acquiring step are used as variables; and
   a pointer-region determining step that determines that, of the pixel regions extracted as candidate pointer regions in the step that extracts the candidate pointer-region, one pixel region that has the highest value is the pointer region.

16. A pointer-region detecting method that detects an optical pointer region indicating a prescribed position in an OHP image, in a video-frame image obtained by photographing the OHP image, the method characterized by comprising:
   an RBG-value acquiring step that acquires an RGB value in each pixel region of a video frame;
   a binary-image generating step that generates a binary image from the RGB value acquired in the RBG-value acquiring step, in accordance with whether the hue satisfies a prescribed formula;
   a candidate-region extracting step that extracts a plurality of candidate regions from the binary image, by using labeling;
   a background-color calculating step that calculates a background color by using each region, except those parts which include the candidate regions in the video-frame image;
   an average-color calculating step that calculates an average color of each candidate pointer region by using the candidate region part of each candidate region in the video-frame image; and
   a pointer-region determining step that determines, by using the color data, whether the candidate pointer region is a pointer region, on the basis of the average-color distribution of the candidate pointer regions with respect to the background color.

17. A pointer-region detecting method that detects an optical pointer region indicating a prescribed position in an OHP image, in a video-frame image obtained by photographing the OHP image, the method characterized by comprising:
   an RGB-value acquiring step that acquires an RGB value in each pixel region of a video-frame image;
   a binary-image generating step that generates a binary image from the RGB value acquired in the RGB-value acquiring step and in accordance with whether the hue satisfies a prescribed formula;
   a candidate-region extracting step that extracts a plurality of candidate regions from the binary image, by using labeling;
   an average-color calculating step that calculates an average color of each candidate region that includes the plurality of candidate regions in the video-frame image;
   a candidate pointer-pattern extracting step that extracts candidate pointer patterns from each candidate region, by using the average color;
   an elliptical-shape calculating step that calculates an elliptical shape by using the envelope of the pointer pattern; and
   a pointer-region determining step that uses shape data and determining whether the candidate pointer pattern is a laser-pointer region, on the basis of the ratio of the area of the elliptical shape to the area occupied by the pixels that form the pointer pattern.

18. A pointer-region detecting program to be executed by a computer to detect an optical pointer region indicating a prescribed position in an OHP image, in a video-frame image obtained by photographing the OHP image, the program describing:
   an RBG-value acquiring step that acquires an RGB value in each pixel region of a video-frame image;
   a candidate pointer-region extracting step that extracts, as candidate pointer regions, pixel regions that satisfy a prescribed formulas in which the RGB values acquired in the RGB-value acquiring step are used as variables; and
   a determining step that determines that, of the pixel regions extracted as candidate pointer regions in the step that extracts the candidate pointer-region, one pixel region that has the highest value is the pointer region.

19. A pointer-region detecting program to be executed by a computer to detect an optical pointer region indicating a prescribed position in an OHP image, in a video-frame image obtained by photographing the OHP image, the program describing:
   an RBG-value acquiring step that acquires an RGB value in each pixel region of a video frame;
   a binary-image generating step that generates a binary image from the RGB value acquired in the RBG-value acquiring step, in accordance with whether the hue satisfies a prescribed formula;
   a candidate-region extracting step that extracts a plurality of candidate regions from the binary image, by using labeling;
   a background-color calculating step that calculates a background color by using each region, except those parts which include the candidate regions in the video-frame image;
   an average-color calculating step that calculates an average color of each candidate pointer region by using the candidate region part of each candidate region in the video-frame image; and
   a pointer-region determining step that determines, by using the color data, whether the candidate pointer region is a pointer region, on the basis of the average-color distribution of the candidate pointer regions with respect to the background color.

20. A pointer-region detecting program to be executed by a computer to detect an optical pointer region indicating a prescribed position in an OHP image, in a video-frame image obtained by photographing the OHP image, the program describing:
   an RGB-value acquiring step that acquires an RGB value in each pixel region of a video-frame image;
   a binary-image generating step that generates a binary image from the RGB value acquired in the RBG-value acquiring step and in accordance with whether the hue satisfies a prescribed formula;

a candidate-region extracting step that extracts a plurality of candidate regions from the binary image, by using labeling;

an average-color calculating step that calculates an average color of each candidate region that includes the plurality of candidate regions in the video-frame image;

a candidate pointer-pattern extracting step that extracts candidate pointer patterns from each candidate region, by using the average color;

an elliptical-shape calculating step that calculates an elliptical shape by using the envelope of the pointer pattern; and a pointer-region determining step that uses shape data and determining whether the candidate pointer pattern is a laser-pointer region, on the basis of the ratio of the area of the elliptical shape to the area occupied by the pixels that form the pointer pattern.

* * * * *

UNITED STATES PATENT AND TRADEMARK OFFICE
CERTIFICATE OF CORRECTION

PATENT NO.       : 7,341,352 B2                                          Page 1 of 1
APPLICATION NO.  : 11/045112
DATED            : March 11, 2008
INVENTOR(S)      : Yutaka Katsuyama It is certified that error appears in the above-identified patent and that said Letters Patent is hereby corrected as shown below:

Title Page, item (57); Column 2 (Abstract), Line 3, change "14" to --114--.

Signed and Sealed this

Fifth Day of August, 2008

JON W. DUDAS
*Director of the United States Patent and Trademark Office*